United States Patent
Bosshart et al.

(10) Patent No.: US 9,912,610 B2
(45) Date of Patent: Mar. 6, 2018

(54) DATA-PLANE STATEFUL PROCESSING UNITS IN PACKET PROCESSING PIPELINES

(71) Applicant: Barefoot Networks, Inc., Palo Alto, CA (US)

(72) Inventors: Patrick Bosshart, Plano, TX (US); Jay Evan Scott Peterson, San Francisco, CA (US); Michael Gregory Ferrara, Palo Alto, CA (US); Changhoon Kim, Palo Alto, CA (US); Steven Licking, San Jose, CA (US); Chaitanya Kodeboyina, Los Altos, CA (US)

(73) Assignee: BAREFOOT NETWORKS, INC., Palo Alto, CA (US)

( * ) Notice: Subject to any disclaimer, the term of this patent is extended or adjusted under 35 U.S.C. 154(b) by 204 days.

(21) Appl. No.: 14/863,961

(22) Filed: Sep. 24, 2015

(65) Prior Publication Data
US 2017/0093986 A1    Mar. 30, 2017

(51) Int. Cl.
*H04L 12/931* (2013.01)
*H04L 12/00* (2006.01)
*H04L 12/26* (2006.01)

(52) U.S. Cl.
CPC .............. *H04L 49/00* (2013.01); *H04L 12/00* (2013.01); *H04L 43/0864* (2013.01)

(58) Field of Classification Search
CPC ....... H04L 67/10; H04L 67/142; H04L 49/00; H04L 12/00; H04L 43/0864
See application file for complete search history.

(56) References Cited

U.S. PATENT DOCUMENTS

| | | |
|---|---|---|
| 2002/0001356 A1 | 1/2002 | Shenoi |
| 2013/0003556 A1 | 1/2013 | Bodén et al. |
| 2013/0227051 A1 | 8/2013 | Khakpour et al. |
| 2014/0181232 A1 | 6/2014 | Manula et al. |
| 2014/0241362 A1* | 8/2014 | Bosshart ............... H04L 45/74 370/392 |
| 2014/0244966 A1* | 8/2014 | Bosshart ............... H04L 49/90 711/206 |

(Continued)

OTHER PUBLICATIONS

Arashloo, Mina Tahmasbi, et al., "SNAP: Stateful Network-Wide Abstractions for Packet Processing," SIGCOMM'16, Aug. 22-26, 2016, 27 pages, ACM, Florianopolis, Brazil.

(Continued)

*Primary Examiner* — Jianye Wu
(74) *Attorney, Agent, or Firm* — Adeli LLP

(57) ABSTRACT

A synchronous packet-processing pipeline whose data paths are populated with data-plane stateful processing units (DSPUs) is provided. A DSPU is a programmable processor whose operations are synchronous with the dataflow of the packet-processing pipeline. A DSPU performs every computation with fixed latency. Each DSPU is capable of maintaining a set of states and perform its computations based on its maintained set of states. The programming of a DSPU determines how and when the DSPU updates one of its maintained states. Such programming may configure the DSPU to update the state based on its received packet data, or to change the state regardless of the received packet data.

20 Claims, 25 Drawing Sheets

(56) References Cited

U.S. PATENT DOCUMENTS

2017/0093707 A1 3/2017 Kim et al.
2017/0093987 A1 3/2017 Sivaraman Kaushalram et al.

OTHER PUBLICATIONS

Bosshart, Patrick, et al., "Forwarding Metamorphosis: Fast Programmable Match-Action Processing in Hardware for SDN," SIGCOMM'13, Aug. 12-16, 2013, 12 pages, ACM, Hong Kong, China.
Moshref, Masoud, et al., "Flow-level State Transition as a New Switch Primitive for SDN," SIGCOMM'14, Aug. 22, 2014, 6 pages, ACM, Chicago, IL, USA.
Sivaraman, Anirudh, et al., "Towards Programmable Packet Scheduling," HotNets '15, Nov. 16-17, 2015, 7 pages, ACM, Philadelphia, USA.
Sivaraman, Anirudh, et al., "Packet Transactions: A Programming Model for Data-Plane Algorithms at Hardware Speed," arXiv:1512.05023v1, Dec. 16, 2015, 22 pages.
Sivaraman, Anirudh, et al., "Packet Transactions: High-level Programming for Line-Rate Switches," arXiv:1512.05023v2, Jan. 30, 2016, 16 pages.
Sivaraman, Anirudh, et al., "Programmable Packet Scheduling at Line Rate," SIGCOMM'16, Aug. 22-26, 2016, 14 pages, ACM, Florianopolis, Brazil.
Sivaraman, Anirudh, et al., "Packet Transactions: High-level Programming for Line-Rate Switches," SIGCOMM'16, Aug. 22-26, 2016, 14 pages, ACM, Florianopolis, Brazil.

\* cited by examiner

```
1  # define NUM_FLOWLETS 8000
2  # define THRESHOLD 5
3  # define NUM_HOPS 10
4
5  struct Packet {
6      int sport ;
7      int dport ;
8      int new_hop ;
9      int arrival ;
10     int next_hop ;
11     int id; // array index
12 };
13
14 int last_time [ NUM_FLOWLETS ] = {0};
15 int saved_hop [ NUM_FLOWLETS ] = {0};
16
17 void flowlet ( struct Packet pkt ) {
18     pkt.new_hop = hash3 ( pkt.sport ,
19                           pkt.dport ,
20                           pkt.arrival )
21                   % NUM_HOPS ;
22
23     pkt .id = hash2 ( pkt.sport ,
24                       pkt.dport )
25                  % NUM_FLOWLETS ;
26
27     if (pkt.arrival - last_time [ pkt.id]
28                > THRESHOLD )
29     { saved_hop [ pkt.id] = pkt.new_hop ; }
30
31     last_time [ pkt.id] = pkt.arrival ;
32     pkt.next_hop = saved_hop [ pkt.id ];
33 }
```

*Figure 16*

*Figure 17a*
*Figure 17b*
*Figure 17c*
```
1 pkt.id = hash2 ( pkt.sport , pkt.dport ) % NUM_FLOWLETS ;
2 pkt.saved_hop = saved_hop [ pkt.id ];
3 pkt.last_time = last_time [ pkt.id ];
4 pkt.new_hop = hash3 ( pkt.sport , pkt.dport , pkt.arrival ) % NUM_HOPS ;
5 pkt.tmp = pkt.arrival - pkt.last_time ;
6 pkt.tmp2 = pkt.tmp > THRESHOLD ;
7 pkt.next_hop = pkt.tmp2 ? pkt.new_hop : pkt.saved_hop ;
8 saved_hop [ pkt.id] = pkt.tmp2 ? pkt.new_hop : pkt.saved_hop ;
9 last_time [ pkt.id] = pkt.arrival ;
```
*Figure 17d*

```
stateful_alu <name> {
    register: <reg ref, indexed if not direct-mapped>;

condition_a: <boolean expr>;
    condition_b: <boolean expr>;

update_hi_1_predicate: <boolean expr of variables 'a' and 'b'>;
    update_hi_1_value: <numeric expr, possibly involving variable 'register'>;

update_hi_2_predicate: <boolean expr of variables 'a' and 'b'>;
    update_hi_2_value: <numeric expr, possibly involving variable 'register'>;

update_lo_1_predicate: <boolean expr of variables 'a' and 'b'>;
    update_lo_1_value: <numeric expr, possibly involving variable 'register'>;

update_lo_2_predicate: <boolean expr of variables 'a' and 'b'>;
    update_lo_2_value: <numeric expr, possibly involving variable 'register'>;

output_predicate: <boolean expr of variables 'a' and 'b'>;

output_expr: <new_hi or new_lo or old_hi or old_lo or boolean expr of a and b>;

output_dst: <field ref or reduction_or ref>;
```

*Figure 20*

```
/* Runtime tunable parameter. 20
microseconds*/
run_time_param timeout (default: 20000;}

/* List of packet header fields identifying a
flow. */
field_list hash_fields_5_tuple {
    ipv4.srcAddr;
    ipv4.dstAddr;
    ipv4.protocol;
    tcp.srcPort;
    upd.srcPort;
    tcp.dstPort;
    udp.dstPort;
}
/* Hash computation using the fields listed
above. */
field_list_calculation hash_id {
    input { hash_fields_5_tuple}
    algorithm : crc32;
    output_width : 16;
}
/* Stateful memory layout, 32 bit timestamp
and 16 bit
 * next hop. */
header_type flowlet_state_layout {
    flowlet_next_hop : 16;
    flowlet_last_time_seen : 32;
}
/* Enough instances of stateful memory cells
for every
 * possible hash value. */
register flowlet_state {
    layout : flowlet_state_layout;
    instance_count : 65536;
} stateful_alu flowlet_state_alu {
2110 ─────     register: flowlet_state[ hash_id ];
               condition_a:
               time_delta( ig_intr_md.ingress_mac_tstamp, register_lo)
               > timeout:
                   condition_b: false;

update_hi_1_predicate: a;
               update_hi_1_value: ingress_md.next_hop;

update_lo_1_predicate: true;
               update_lo_1_value: ig_intr_md.ingress_mac_tstamp;

output_predicate: true;
               output_expr: new_hi;

output_dst: ingress_md.next_hop;
            } action get_flowlet_next_hop() {
                execute_stateful_alu( flowlet_state_alu );
            } table flowlet_next_hop {
                reads {}
                actions {get_flowlet_next_hop();}
            }
```

```
/* List of packet header fields identifying
 a flow. */
field_list fields_for_hash {
    ipv4.srcAddr;
    ipv4.dstAddr; }
/* Hash computation using the fields listed
above. */
field_list_calculation hash_1{
    input { fields_for_hash }
    algorithm : hash_function_1;
    output_width : 18; }
field_list_calculation hash_2 {
    input { fields_for_hash }
    algorithm : hash_function_2;
    output_width : 18; }
field_list_calculation hash_3 {
    input { fields_for_hash }
    algorithm : hash_function_3;
    output_width : 18; }

/* A bit vector of 256k bits representing
 * the filter.
 * Replicated per hash function. */
register bloom_filter_1{
    width : 1;
    instance_count : 262144;
}
register bloom_filter_2{
    width : 1;
    instance_count : 262144;
}
register bloom_filter_3{
    width : 1;
    instance_count : 262144;
}

2230──reduction_or_combine_filter {
    output_dst: ingress_md.is_not_member;
}
2211──stateful_alu bloom_filter_1{
    register: bloom_filter_1[hash_1];
    update_lo_1_value: 1;
    output_expr: !old_lo;
    output_dst: combine_filter;
}
2212──stateful_alu bloom_filter_2{
    register: bloom_filter_2[hash_2];
    update_lo_1_value: 1;
    output_expr: !old_lo;
    output_dst: combine_filter;
}
2213──stateful_alu bloom_filter_3{
    register: bloom_filter_3[hash_3];
    update_lo_1_value: 1;
    output_expr: !old_lo;
    output_dst: combine_filter;
} action run_filter() {
    execute_stateful_alu(bloom_filter_1);
    execute_stateful_alu(bloom_filter_2);
    execute_stateful_alu(bloom_filter_3);
} table bloom_filter_membership {
    reads {}
    actions { run_filter; }
}
```

```
run_time_param low_threshold { default: 10000000; }
run_time_param high_threshold {default: 50000000; } field_list_fields_for_hash { ipv4.srcAddr; } field_list_calculation hash_1 {
    input { fields_for_hash }
    algorithm : hash_function_1;
    output_width : 12; }
field_list_calculation hash_2 {
    input { fields_for_hash }
    algorithm : hash_function_2;
    output_width : 12; }
field_list_calculation hash_3 {
    input { fields_for_hash }
    algorithm : hash_function_3;
    output_width : 12; } register sketch_cnt_1{
    width : 32;
    saturating;
    instance_count : 4096;
}
register sketch_cnt_2{
    width : 32;
    saturating;
    instance_count : 4096;
}
register sketch_cnt_3{
    width : 32;
    saturating;
    instance_count : 4096;
} reduction_or_combine {
    output_dst: ingress_md.is_not_heavy_hitter;
}
```

```
         stateful_alu sketch_cnt_alu_1 {
             register: sketch_cnt_1[hash_1];
             condition_a: register > low_threshold
             condition_b: register < high_threshold
             update_lo_1_value: register + 1;
             update_hi_1_value: 1
2311 ─────  output_cond: !a || !b
             output_expr: new_hi;
             output_dst: combine;
         }
         stateful_alu sketch_cnt_alu_2 {
             register: sketch_cnt_2[hash_2];
             condition_a: register > low_threshold
             condition_b: register < high_threshold
             update_lo_1_value: register + 1;
             update_hi_1_value: 1
2312 ─────  output_cond: !a || !b
             output_expr: new_hi;
             output_dst: combine;
         }
         stateful_alu sketch_cnt_alu_3 {
             register: sketch_cnt_3[hash_3];
             condition_a: register > low_threshold
             condition_b: register < high_threshold
             update_lo_1_value: register + 1;
             update_hi_1_value: 1
2313 ─────  output_cond: !a || !b
             output_expr: new_hi;
             output_dst: combine;
         }
         action run_filter() {
             execute_stateful_alu(sketch_cnt_alu_1 );
             execute_stateful_alu(sketch_cnt_alu_2 );
             execute_stateful_alu(sketch_cnt_alu_3 );
         }
```

```
/* Stateful memory layout, 8 bit next hop
utilization. */
header_type conga_state_layout {
    next_hop : 8;
    utilization : 8;
} register conga_state {
    layout : conga_state_layout;
    instance_count : 256;
    direct;
} stateful_alu conga_alu {
    register: conga_state_layout;
    output_expr: new_hi;
    output_dst: ingress_md.next_hop;
} stateful_alu conga_update_alu {
    register: conga_state_layout;
    condition_a: register_lo >
        conga_state_md.util
    condition_b: register_hi ==
        conga_state_md.next_hop
    update_hi_1_predicate: a;
    update_hi_1_value: conga_state_md.next_hop;——2421
    update_lo_1_predicate: a || b;
    update_lo_1_value: conga_state_md.util ——2422
    output_expr: new_hi;
    output_dst: ingress_md.next_hop;
} action get_prefered_next_hop() {
    execute_stateful_alu(conga_alu);
} action update_prefered_next_hop() {
    execute_stateful_alu(conga_update_alu);
} table conga_rd_next_hop_table {
    reads {
        ingress_md.dst_tor_id : exact;
    }
    actions {
        get_prefered_next_hop;
    }
    size : 256
} table conga_wr_next_hop_table {
    reads {
        ingress_md.dst_tor_id : exact;
    }
    actions {
        update_prefered_next_hop;
    }
    size : 256
}
```

DATA-PLANE STATEFUL PROCESSING UNITS IN PACKET PROCESSING PIPELINES

BACKGROUND

Data-plane algorithms are algorithms implemented within a network switch. These algorithms process every data packet passing through the switch, transforming the packet and often some state stored on the switch. Examples include in-network congestion control, active queue management, network measurement, and load-balanced data-plane routing.

Because data-plane algorithms process every packet, an important implementation requirement is the ability to process packets at line rate. As a result, these algorithms are typically implemented using dedicated hardware. However, hardware designs are rigid, preventing reconfigurability in the field. This rigidity affects network switch vendors building switch boxes based on merchant-silicon switch chips, network operators using merchant silicon within private networks, and researchers developing new switch algorithms. Today, the only way to implement a new data-plane algorithm at line rate is to build hardware for it.

SUMMARY

Some embodiments of the invention provide a synchronous packet-processing pipeline whose data paths are populated with data-plane stateful processing units (DSPUs). A DSPU is a programmable processor whose operations are synchronous with the dataflow of the packet-processing pipeline. In some embodiments, a DSPU performs every computation with fixed latency (e.g., fixed number of clock cycles). In some embodiments, each DSPU receives packet data from a previous packet-process pipeline stage, performs computation/processing based on the receive packet data, and injects the result to a next packet-processing pipeline stage. In other words, a DSPU can be viewed as a part of the packet-processing pipeline.

In some embodiments, each DSPU is capable of maintaining a set of states and perform its computations based on its maintained set of states. In some embodiments, the programming of a DSPU determines how and when the DSPU updates one of its maintained states. Such programming may configure the DSPU to update the state based on its received packet data, or to change the state regardless of the received packet data (e.g., based on time stamp or based on the number of times the DSPU executes). In some embodiments, the state maintained by a DSPU is used by the DSPU and not shared with any other DSPU.

Each DSPU maintains and uses (i.e., reads and writes) its own set of state information. In some embodiments, a DSPU uses and maintains only its own set of state information and does not share its state information with any other DSPUs, whether in the same data processing stage or other data processing stage. In some embodiments, the set of state information includes state variables that the DSPU uses to statefully perform computation tasks for the data processing stage that the DSPU reside in. A stateful variable is a variable that is accessible by a class of packets (e.g., all packets having a same hash value) and can be changed by each passing packets belonging to that class of packets to affect the operations of subsequent packets. In some embodiments, a DSPU-implemented application uses and updates one stateful variable at one DSPU while using and updating another stateful variable at another DSPU. In some embodiments, a stateful variable maintained and used by a DSPU would not affect the operations of another DSPU (i.e., is not accessible by another DSPU in the system).

In addition to maintaining and using its own state information, each DSPU also receives data as packet header vectors (PHVs) from a previous processing stage and generates data for a subsequent processing stage. In some embodiments, these data are extracted from or derived based on content of the incoming packets of the packet-processing pipeline. These packet data flows or propagates through the packet-processing pipeline, where the DSPUs of the pipeline perform at least some of the packet data processing.

In some embodiments, a derivative PHV produced by a particular data processing stage includes the computation results of that data processing stage. In some embodiments, at least some of these computation results are produced by the DSPUs of the particular data processing stage. In some embodiments, the derivative PHV includes unmodified data from the received PHV along with data that are modified by the data processing stage. In some embodiments, the derivative PHV includes metadata that are inserted by the data processing stage according to its programming. All of the data in the derivative PHV are then provided to the next data processing stage, which in turn uses the data in the derivative PHV and its own programming to create its output next order derivative PHV.

In some embodiments, a DSPU uses data in a PHV as packet variables. Specifically, in some embodiments, when a data processing stage receives a PHV and produces a derivative PHV, a DSPU of the stage uses data in the PHV as packet variables. The programming of a DSPU can read packet variables and write to packet variables. The read and write of packet variables are implemented as reading a field in the received PHV and writing to a field in the outgoing derivative PHV in some embodiments. In some embodiments, a packet variable is a variable that is applicable to (i.e., used and maintained by) only one packet; it does not affect the packet processing operation of any other packet. In some embodiments, a DSPU-implemented application uses and/or updates a packet variable for a packet at one DSPU and then uses the updated packet variable at another DSPU to continue processing the same packet. In some embodiments, packet variables are passed/carried from one DSPU to another DSPU through PHVs or packet metadata. In contrast to state variables, packet variables are not stored by DSPUs, but are rather passed from DSPUs to DSPUs. Furthermore, each packet variable is packet specific, i.e., used (i.e., read and written) for one packet only.

In some embodiments, a state variable being maintained at a DSPU is specific to a packet, or a class of packet. In other words, a DSPU maintains and uses different state variables for different classes of packets. When a DSPU is processing a packet belonging to a particular class, the DSPU uses only the state variables of that class of packets, and the state variable of that class of packet affects only that class of packets at the DSPU. In some embodiments, such a class of packet is defined by the PHV, e.g., packets having the same PHV (or same packet header fields) would use the same set of state variables at a given DSPU. Specifically, in some of these embodiments, packets having the same hash value for PHV are defined to be in a same class of packets with regard to state variables. In some embodiments, each class of packets corresponds to a L4 connection or flow of packets, which share a same set of flow identifiers (e.g., five-tuple of source address, destination address, source port, destination port, and transport protocol).

In some embodiments, each DSPU maintains and uses its state variables by performing read-modify-write operations, i.e., the DSPU reads a state variable and write it back, if necessary, to its original location in memory storage. In some embodiments, the read-modify-write operations of the DSPU allows it to process a different PHV on every clock cycle, thus ensuring that the DSPU would be able to operate synchronously with the dataflow of the packet processing pipeline. In some embodiments, the DSPU requires multiple clock cycles (e.g., 2) to complete its computation and read-modify-write operations. In other words, the DSPU is itself a pipeline of multiple stages. However, the DSPU is still capable of handling a new PHV on every clock cycle and thus would remain in synchronous relationship with the rest of packet-processing pipeline.

As mentioned, in some embodiments, a data processing stage of a packet-processing pipeline can include multiple DSPUs. In some embodiments, these DSPUs operate in parallel to perform different parts of a computation that do not depend on each other. In some embodiments, each DSPU contributes a set of packet variables in the outgoing derivative PHV of the data processing stage.

In some embodiments, the packet-processing pipeline is a network switch that modifies and switches packets, as well as collects information on packets, ports, etc., for the purpose of managing the switch and the network. In such a pipeline, packets are matched against a set of rules, and matching rules have corresponding actions that can transform or route the packet. In some embodiment, the match-action operations of the switch are defined by OpenFlow protocol.

In some embodiments, a DSPU include ALUs (arithmetic logic units) and comparators that are used to predicate on or off the ALUs. This predication allows conditional computation statement such as "X=cond ? A:B" to be executed quickly in the data-plane with little hardware cost. This mechanism is used to conditionally compute packet variables and/or update state variables. When conditionally updating a state variable, at least three different types of results are possible, namely (i) to update according to output of a first ALU, (ii) to update according to output of a second ALU, or (iii) to keep the same value. In some embodiments, each comparator is capable of computation of three operands A, B, and C. In some embodiments, the comparator is implemented as a three operand adder, implementing: ±A ±B +C, where A and B are operands whose signs are optionally inverted by the instruction word. This allows operations such as (current_time−previous_time)>threshold, where threshold is a constant.

In some embodiments, DSPU performs double-wide computations that use both Hi and Lo computation components (ALUs and comparators) jointly to perform computation whose operands are twice as wide. Hi and Lo ALUs jointly perform one double-wide ALU computation. Hi and Lo comparators jointly perform one double-wide computation to produce one true/false condition.

Some embodiments provide a compiler for converting text-based source code into configurations or sets of instructions for individual DSPUs in a pipeline. The DSPUs in a packet-processing pipeline, when configured by these configurations or sets of instructions, would perform data-plane algorithms specified by the text-based source code. In some embodiments, the compiler converts the text-based source code into codelets and then uses a DSPU constraint template to perform executability check for each codelet. Some embodiments returns compiler error if any of the codelets fail to comply with the requirement of the constraint template. In some embodiments, a DSPU constraint template defines a space of possible computations that are executable on the DSPU (such as different ALU operations, or different permitted sequences three-address instructions). In some embodiments, the DSPU constraint template is also a synthesis template or syntax guide, where the compiler synthesizes the configuration for a DSPU by fitting syntax element of a codelet with the synthesis template. If the syntax of a codelet is not able to fit the constraint/synthesis template, the compiler indicates compiler error as the compiler is not able to create an executable DSPU configuration out of the codelet. Some embodiments use a synthesis tool such as SKETCH to perform the synthesis of DSPU configuration. Such synthesis tools allow the programmer to use natural imperative syntax to specify a synthesis template or partial program with "holes" that are then filled in by the synthesis tool to match the codelet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 16 illustrates an example program of packet transactions.

FIG. 17a illustrates an example if-conversion.

FIG. 17b illustrates a transformation of a state variable into load and store operations.

FIG. 17c illustrates the conversion into SSA forms.

FIG. 17d illustrates an example of the conversion to three-address code for some embodiments.

FIG. 20 illustrates a P4 object for specifying the behavior of DSPU.

FIG. 21 illustrates a code fragment for execution on DSPUs for flowlet switching.

FIG. 22 illustrates a code fragment for using DSPUs to check for membership and add to the Bloom filter.

FIG. 23 illustrates a code fragment for using DSPUs to perform heavy hitter algorithm.

FIG. 24 illustrates a code segment for using DSPUs to perform Conga algorithm.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a synchronous packet-processing pipeline whose data paths are populated with data-plane stateful processing units (DSPUs). A DSPU is a programmable processor whose operations are synchronous with the dataflow of the packet-processing pipeline. Unlike a control plane processor or controller whose operations can be asynchronous to the data-plane with variable or unpredictable latency, a DSPU performs every computation with fixed latency (e.g., fixed number of clock cycles). In some embodiments, each DSPU receives packet data from a previous packet-process pipeline stage, performs computation/processing based on the receive packet data, and injects the result to a next packet-processing pipeline stage. In other words, a DSPU can be viewed as a part of the dataflow of the packet-processing pipeline.

Unlike ordinary stateless packet processing pipeline stages, each DSPU performs its operations statefully. Specifically, each DSPU is capable of maintaining a set of states and perform its computations based on its maintained set of states. In some embodiments, the programming of a DSPU determines how and when the DSPU updates one of its maintained states. Such programming may configure the DSPU to update the state based on its received packet data, or to change the state regardless of the received packet data (e.g., based on time stamp or based on the number of times the DSPU executes). In some embodiments, the state maintained by a DSPU is used by the DSPU and not shared with any other DSPU.

Figure 1:
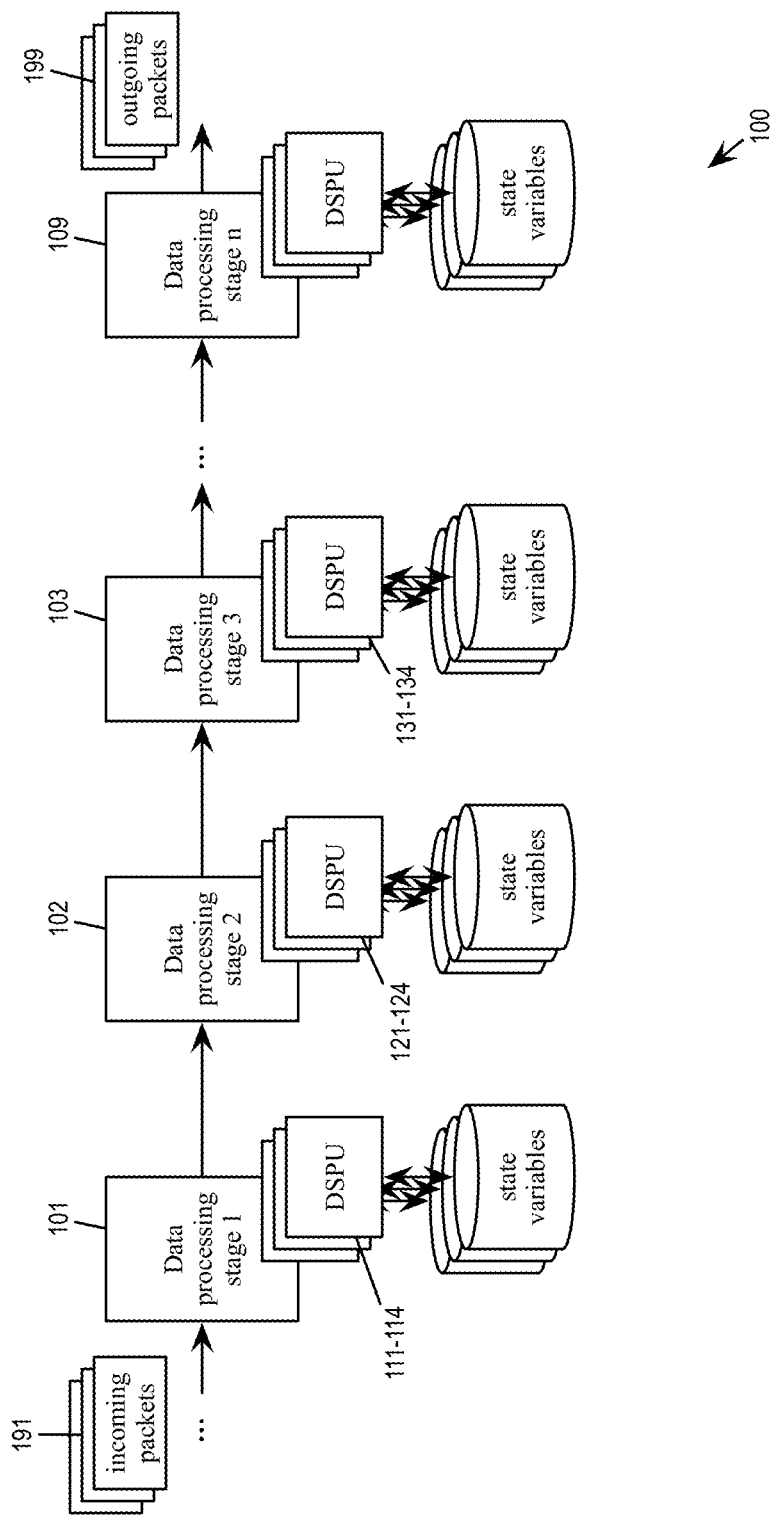
FIG. 1 conceptually illustrates a packet-processing pipeline whose data paths is populated with DSPUs.

FIG. 1 conceptually illustrates a packet-processing pipeline 100 whose data paths is populated with DSPUs. As illustrated, the packet-processing pipeline 100 receives incoming packets 191 and produces outgoing packets 199. The packet-processing pipeline 100 has data processing stages 101-109. Each packet-processing stage has a set of DSPUs. (The data processing stage 101 has DSPUs 111-114, the data processing stage 102 has DSPUs 121-124, etc.)

Each DSPU maintains and uses (i.e., reads and writes) its own set of state information. In some embodiments, a DSPU uses and maintains only its own set of state information and does not share its state information with any other DSPUs, whether in the same data processing stage or other data processing stage. In some embodiments, the set of state information includes state variables that the DSPU uses to statefully perform computation tasks for the data processing stage that the DSPU resides in.

A stateful variable is a variable that is accessible by a class of packets (e.g., all packets having a same hash value) and can be changed by each passing packets belonging to that class of packets to affect the operations of subsequent packets. In some embodiments, a DSPU-implemented application uses and updates one stateful variable at one DSPU while using and updating another stateful variable at another DSPU. In some embodiments, a stateful variable maintained and used by a DSPU would not affect the operations of another DSPU (i.e., is not accessible by another DSPU in the system).

In addition to maintaining and using its own state information, each DSPU also receives data as packet header vectors (PHVs) or metadata from a previous processing stage and generates data for a subsequent processing stage. In some embodiments, these data are extracted from or derived based on content of the incoming packets of the packet-processing pipeline (i.e., 191). These packet data flows/propagates through the packet-processing pipeline, where the DSPUs of the pipeline perform at least some of the packet data processing. For some embodiments, FIG. 2 illustrates the data flow of the packet-processing pipeline 100 through the DSPUs of the packet-processing pipeline 100.

At the start of the packet-processing pipeline 100 is a parser 201 that receives a packet 291, parses it, and creates a PHV 211 based on the packet 291. In some embodiments, the parser 201 extracts data from the header (and/or payload) from the packet 291 to create the PHV 211. The created PHV 211 is provided to the first data processing stage 101. The first data processing stage 101 processes the PHV 211 and outputs a derivative PHV 212 (PHV'). The derivative PHV 212 is in turn provided to the second processing stage 102, which processes the derivative PHV and produces a second order derivative PHV 213 (PHV"). The third processing stage 103 receives and processes the second order derivative PHV 213 and produces a third order derivative PHV 214 (PHV$^3$), so on and so forth. Finally, a deparser 209 at the end of the packet-processing pipeline 100 receives a Nth order derivative PHV from a last data processing stage (not shown) and creates an outgoing packet 299.

In some embodiments, a derivative PHV produced by a particular data processing stage includes the computation results of that data processing stage. In some embodiments, at least some of these computation results are produced by the DSPUs of the particular data processing stage. In some embodiments, the derivative PHV includes unmodified data from the received PHV along with data that are modified by the data processing stage (e.g., by its DSPUs). In some embodiments, the derivative PHV includes metadata that are inserted by the data processing stage according to its programming (e.g., the programming of its DSPUs). All of the data in the derivative PHV are then provided to the next data processing stage, which in turn uses the data in the derivative PHV and its own programming to create its output next order derivative PHV.

Figure 2:
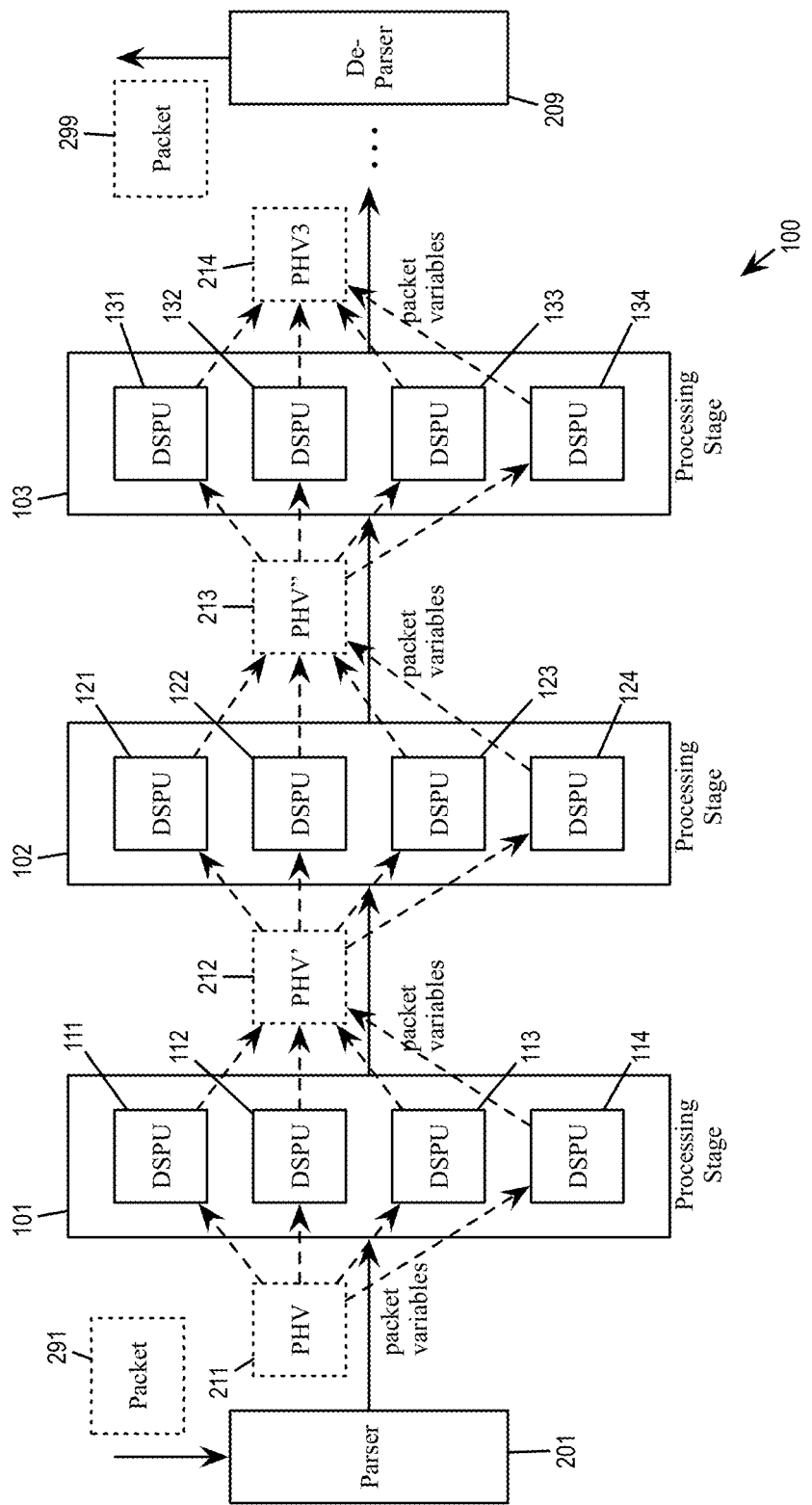
FIG. 2 illustrates the data flow of the packet-processing pipeline through the DSPUs of the packet-processing pipeline.

As illustrated in FIGS. 1 and 2, in some embodiments, a data processing stage may include multiple DSPUs. In some embodiments, the multiple DSPUs of a data processing stage operate in parallel to receive and process the received PHV (e.g., the derivative PHV of a previous stage) and to produce the outgoing next order derivative PHV. The parallel processing of a PHV by DSPUs of a data processing stage of a packet-processing will be further described below by reference to FIG. 6.

In some embodiments, a DSPU uses data in a PHV as packet variables. Specifically, in some embodiments, when a data processing stage receives a PHV and produces a derivative PHV, a DSPU of the stage uses data in the PHV as packet variables. The programming of a DSPU can read packet variables and write to packet variables. The read and write of packet variables are implemented as reading a field in the received PHV and writing to a field in the outgoing derivative PHV in some embodiments.

In some embodiments, a packet variable is a variable that is applicable to (i.e., used and maintained by) only one packet; it does not affect the packet processing operation of any other packet. In some embodiments, a DSPU-implemented application uses and/or updates a packet variable for a packet at one DSPU and then uses the updated packet variable at another DSPU to continue processing the same packet. In some embodiments, packet variables are passed/carried from one DSPU to another DSPU through PHVs or packet metadata.

Figure 3:
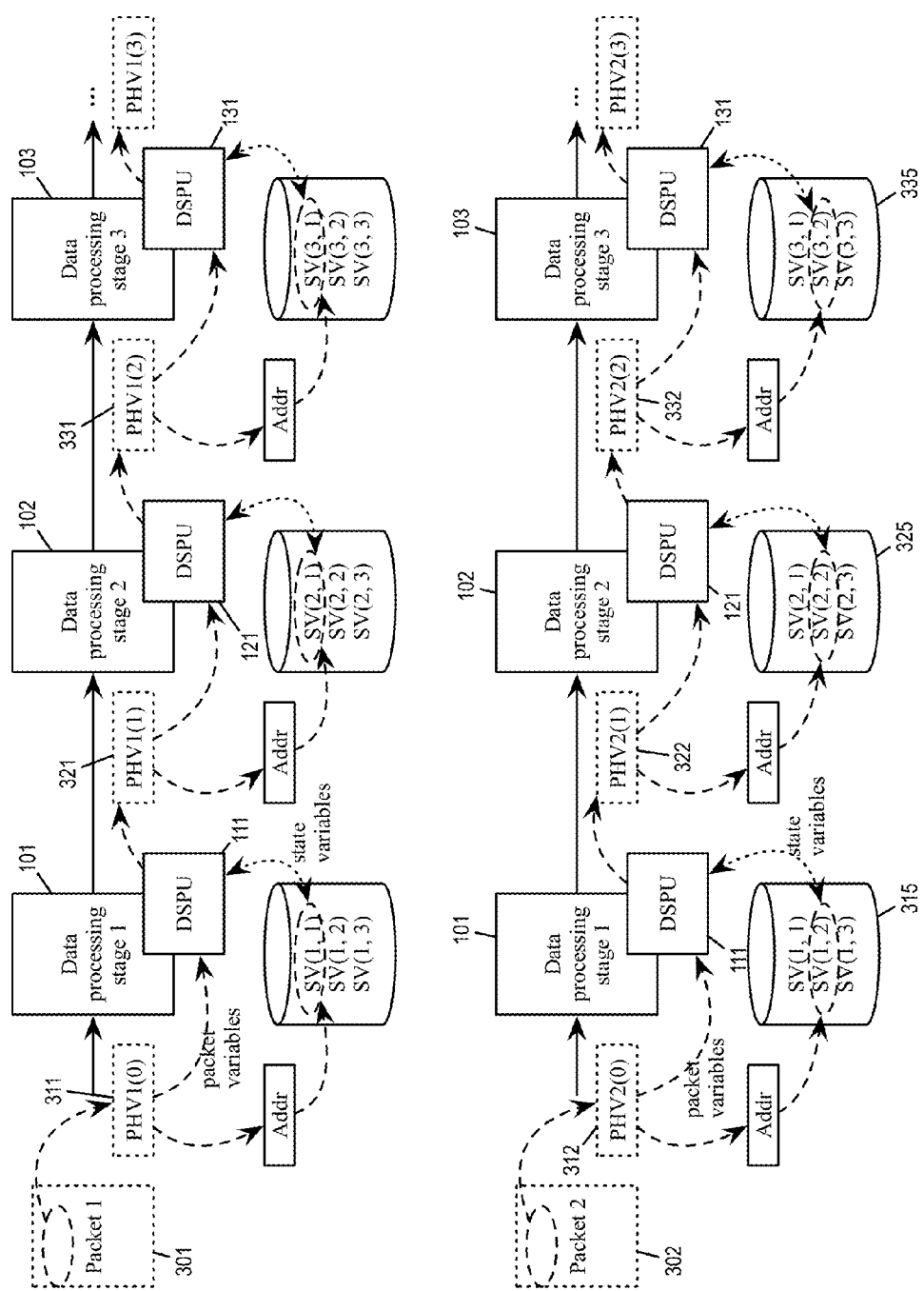
FIG. 3 illustrates the use of packet variables and state variables by DSPUs for processing packets in the packet-processing pipeline.

FIG. 3 illustrates the use of packet variables and state variables by DSPUs for processing packets in the packet-processing pipeline 100. The figure illustrates the processing of two packets 301 and 302.

The pipeline parses the packet 301 into a PHV 311. The DSPU 111 of the data processing stage 101 uses data within the PHV 311 as packet variables. The DSPU 111 also maintains and uses its own state variables 315. The DSPU 111 uses these packet variables and state variables to compute and produce a derived PHV 321 for the next data processing stage 102. The derived PHV 321 may include an update to an existing packet variable, or a new packet variable that is created and inserted by the programming of the DSPU 111. Any updates to the state variables are stored locally by the DSPU 111 to affect future packet processing operations at the DSPU 111.

The DSPU 121 of the data processing stage 102 received the derivative PHV 321 and uses data in the PHV 321 as packet variables. The DSPU 121 also maintains and uses its own set of state variables 325. The DSPU 121 then uses these packet variables and state variables to compute and produce a next order derived PHV 331 for the next data processing stage 103, so on and so forth. In some embodiments, a DSPU uses and maintains only its own set of state information and does not share its state information with any other DSPUs, whether in the same data processing stage or other data processing stage.

As illustrated, each state variable is maintained by one DSPU and is used to determine the computational outcome of one DSPU only. For example the DSPU 111 maintains and uses state variables "SV(1,1)", "SV(1,2)" and "SV(1,3)", DSPU 121 maintains and uses state variables "SV(2,1)", "SV(2,2)" and "SV(2,3)", so and so forth. The state variables "SV(1,1)", "SV(1,2)" and "SV(1,3)" are not used or accessed by any DSPUs other than the DSPU 111, and the state variables "SV(2,1)", "SV(2,2)" and "SV(2,3)" are not used or accessed by any DSPUs other than DSPU 121.

In some embodiments, a state variable being maintained at a DSPU is specific to a packet, or a class of packet. In other words, a DSPU maintains and uses different state variables for different classes of packets. When a DSPU is processing a packet belonging to a particular class, the DSPU uses only the state variables of that class of packets, and the state variable of that class of packet affects only that class of packets at the DSPU.

In some embodiments, such a class of packet is defined by the PHV, i.e., packets having the same PHV would use the same set of state variables at a given DSPU. Specifically, in some of these embodiments, packets having the same hash value for PHV are defined to be in a same class of packets with regard to state variables. In some embodiments, each class of packets corresponds to a L4 connection or flow of packets, which share a same set of flow identifiers (e.g., five-tuple of source address, destination address, source port, destination port, and transport protocol).

As illustrated, each state variable at a DSPU of a data processing stage is accessible by an address that is derived from the PHV received by the data processing stage. For example, the DSPU 111 uses the state variable "SV(1,1)", which is located at an address that is derived from the PHV 311 received by the data processing stage 101 and the DSPU 111. Likewise, the DSPU 121 uses the state variable "SV(2,1)", which is located at an address that is derived from the PHV 321 received by the data processing stage 102 and the DSPU 121.

As mentioned, FIG. 3 illustrates the processing of another packet 302, which has a PHV 312 that is different from the PHV 311 for the packet 301. Since the PHV of the packet 301 and the PHV of the packet 302 are different (e.g., having different hash values), they belong to different classes of packets, and each DSPU uses different state variables for processing the packet 302 than for processing the packets 301. As illustrated, the DSPU 111 uses state variable "SV(1,2)" (rather than "SV(1,1)") for processing the packet 302, while the DSP 121 uses the state variable "SV(2,2)" (rather than "SV(2,1)") for processing the packet 302. This is because the PHVs of the packet 302 (i.e., PHV 312 and derivative PHVs 322 and 332) hashes into different addresses for accessing state variables than the PHVs of the packet 301. Consequently, the state variables for processing the packet 302 are different than the state variables for processing the packet 301.

In some embodiments, each DSPU maintains and uses its state variables by performing read-modify-write operations, i.e., the DSPU reads a state variable and write it back, if necessary, to its original location in memory storage. In some embodiments, the read-modify-write operations of the DSPU allows it to process a different PHV on every clock cycle, thus ensuring that the DSPU would be able to operate synchronously with the dataflow of the packet processing pipeline.

Figure 4:
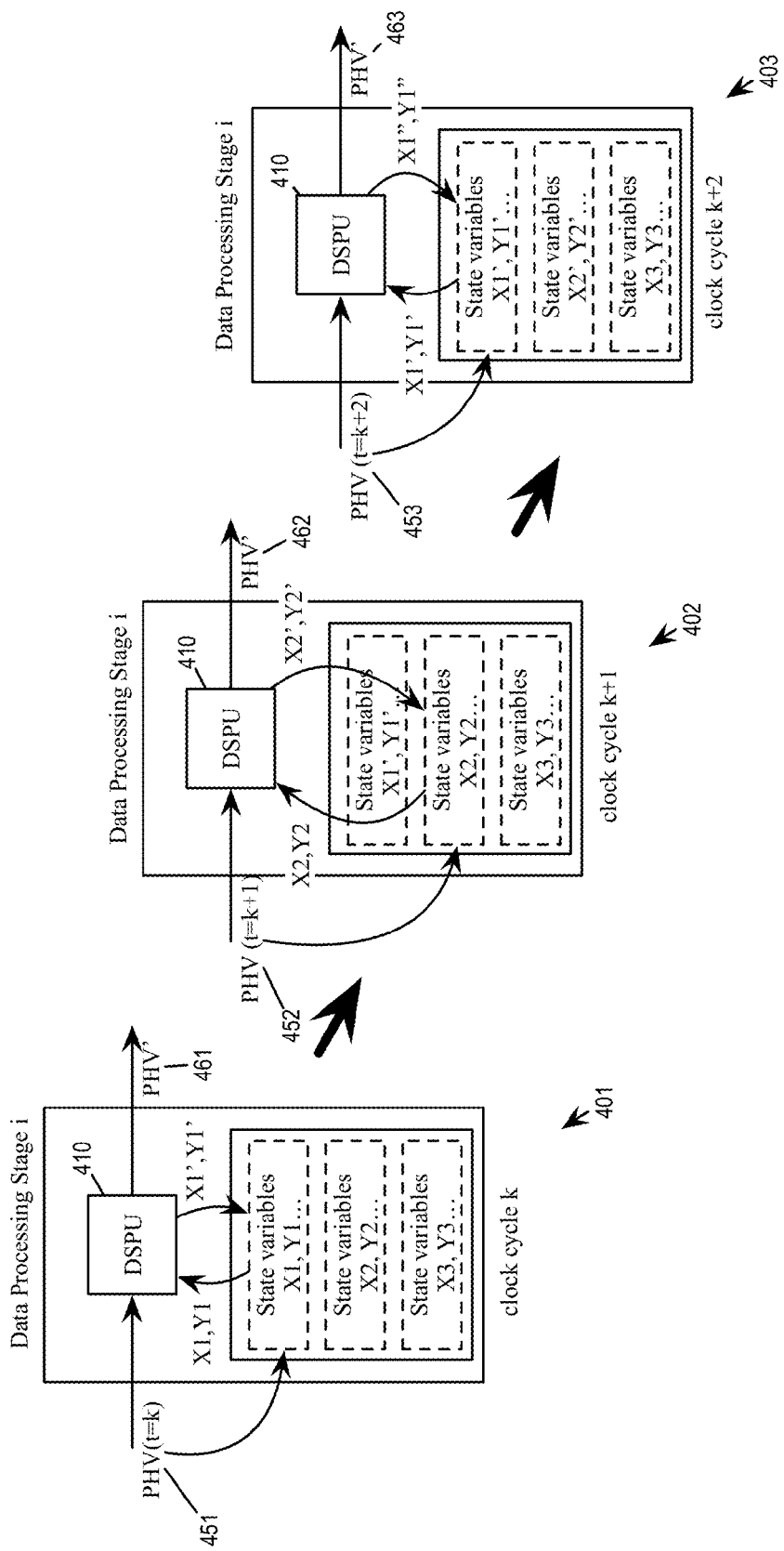
FIG. 4 illustrates a DSPU that is performing read-modify-write operations for using and maintaining state variables.

FIG. 4 illustrates a DSPU 410 that is performing read-modify-write operations for using and maintaining state variables. The DSPU is in one of the data processing stages of a packet-processing pipeline. As illustrated, the DSPU is maintaining three different sets of state variables for three different classes of packets (e.g., packets having different PHV hash values). The first set of state variables includes state variables X1 and Y1, the second set of state variables includes state variables X2 and Y2, and the third set of state variables includes state variables X3 and Y3.

The figure illustrates the operations of the DSPU in three consecutive clock cycles 401-403 (or clock cycles k, k+1 and k+2). At the first clock cycle 401, the DSPU receives a PHV 451 that is translated (e.g., hashed) into an address location that stores the state variables X1 and Y1. The DSPU reads variables X1 and Y1 and uses them to compute the outgoing derivative PHV' 461. The DSPU also modifies X1 and Y1 into X1' and Y1' and stores them back to the same address location.

At the next, second clock cycle 402, the DSPU receives a PHV 452 that is translated into an address location that stores the state variables X2 and Y2. The DSPU reads variables X2 and Y2 and uses them to compute the outgoing derivative PHV' 462. The DSPU also modifies X2 and Y2 into X2' and Y2' and stores them back to the same address location. Modifications made to X1 and Y1 during clock cycle 401 do not affect the operations of the DSPU in clock cycle 402.

At the third clock cycle 403, the DSPU 410 receives a PHV 453 that is translated into address location that stores the state variables X1 and Y1, now X1' and Y1'. In other words, the PHV 453 is of a packet that is in the same class of packet as the PHV 451 such that the modifications/updates made to state variables by the DSPU for the PHV 451 would affect the operations of the DSPU for the PHV 453. In this case, the DSPU at clock cycle 403 reads X1' and Y1' and uses them to perform computation for outgoing derivative PHV' 463, while modifying X1' and Y1' into X1'' and Y1'' before storing them back to the same address location.

In some embodiments, the DSPU requires multiple clock cycles (e.g., 2) to complete its computation and read-modify-write operations. In other words, the DSPU is itself a pipeline of multiple stages. However, the DSPU is still capable of handling a new PHV on every clock cycle and thus would remain in synchronous relationship with the rest of packet-processing pipeline.

Figure 5:
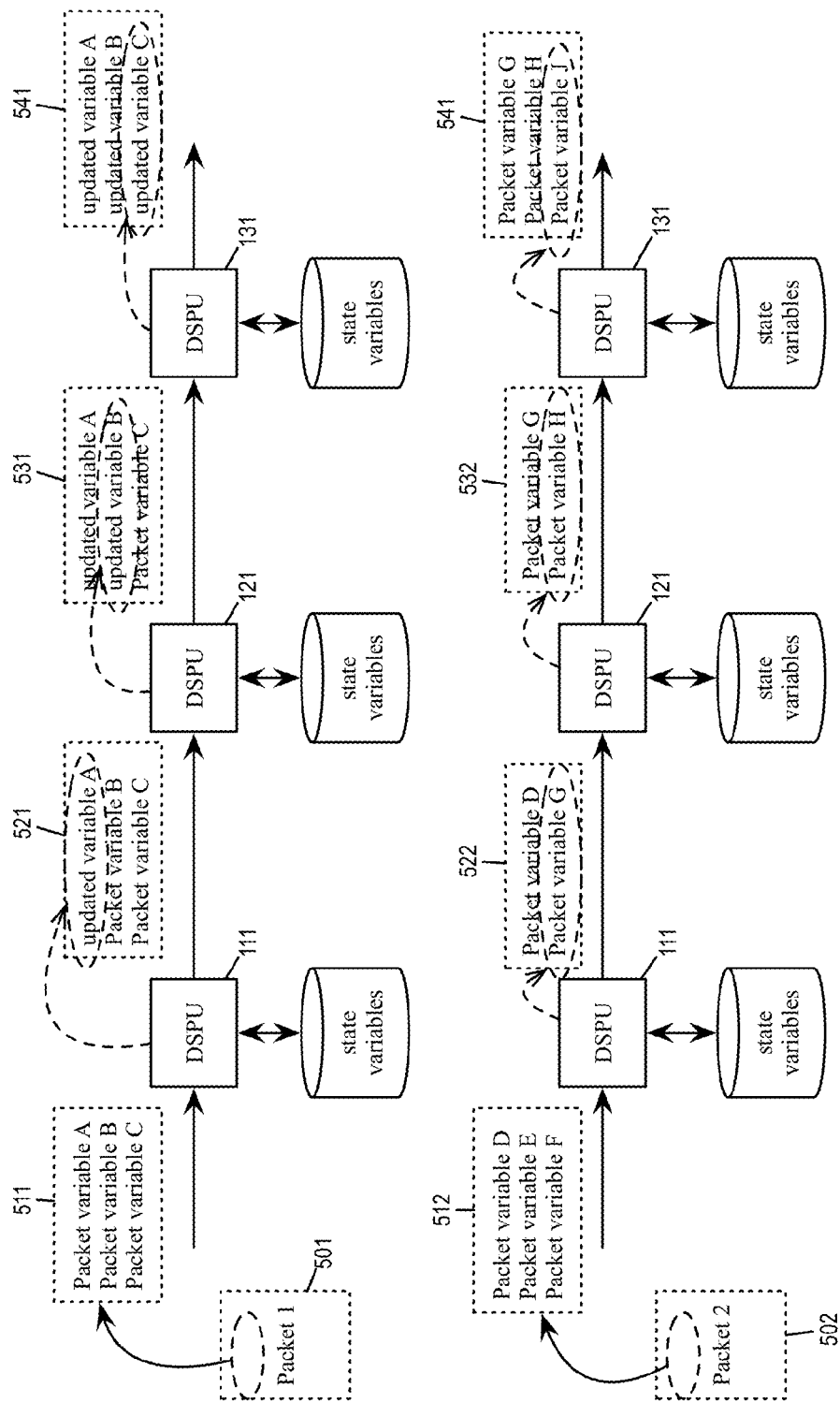
FIG. 5 illustrates DSPUs in the packet-processing pipeline using, updating, and passing packet variables.

In contrast to state variables, packet variables are not stored by DSPUs, but are rather passed from DSPUs to DSPUs. Furthermore, each packet variable is packet specific, i.e., used (i.e., read and written) for one packet only. FIG. 5 illustrates DSPUs in the packet-processing pipeline using, updating, and passing packet variables. The figure illustrates the processing of two different packets 501 and 502 by the DSPUs 111, 121, and 131. These DSPUs reside in consecutive data processing stages 101, 102, and 103. The figure shows how DSPUs are able to perform a long series of computations by passing packet variables. In some embodiments, each DSPU updates or generate only a limited set of packet variables (e.g., only one packet variable).

The packet 501 is parsed into PHV 511. The PHV 511 has three packet variables A, B, and C, and the DSPUs 111, 121, and 131 are programmed to update all three packet variables, where each DSPU is programmed to update one packet variable. As illustrated, the DSPU 111 receives the PHV 511 and produces a derivative PHV 521 (PHV'). The derivative PHV 521 shows that the DSPU 111 has updated the variable A while leaving variables B and C unchanged. The derivative PHV 521 carries the updated variable A and unmodified variables B and C toward the DSPUs 121 and 131. In turn, the DSPU 121 updates the variable B, and the DSPU 131 updates the variable C. Thus in three stages, the DSPUs are able to complete all three packet variable computations. This is important for some embodiments in which each DSPU has limited computation resources or stringent latency requirement, so a longer, more complex computation can be done piecemeal by a series of DSPUs.

The packet 502 is parsed into PHV 512. The PHV 512 has three packet variables D, E, and F, and the DSPUs 111, 121, and 131 are programmed to perform a long computation starting with these three variables, In some embodiments, the DSPUs are programmed to divide the computation into a series of smaller computations by generating and using temporary or intermediate packet variables. The DSPUs then passes these temporary or intermediate packet variables in PHVs/derivative PHVs until the computation is complete. In the example, each DSPU generates one intermediate packet variable for later stages.

As illustrated, the DSPU 111 receives the PHV 512 having packet variables D, E, and F and produces a derivative PHV 522 (PHV'). The derivative PHV 522 shows that the DSPU 111 used the packet variables D, E, and F to produce one intermediate packet variables G while passing on the packet variable D. The derivative PHV 522 carries the packet variables D and G toward the DSPUs 121 and 131. In turn, the DSPU 121 uses the packet variables D and G to generate a new intermediate packet variables H while passing along the packet variable G. The DSPI 131 uses the received packet variables G and H to generate a new packet variable J while passing along both packet variables G and H. Thus in three stages, the DSPUs 111, 121 and 131 are able to complete a complex sequence of computations by passing intermediate computation result onto subsequent stages as packet variables.

As mentioned, in some embodiments, a data processing stage of a packet-processing pipeline can include multiple DSPUs. In some embodiments, these DSPUs operate in parallel to perform different parts of a computation that do not depend on each other. In some embodiments, each DSPU contributes a set of packet variables in the outgoing derivative PHV of the data processing stage.

Figure 6:
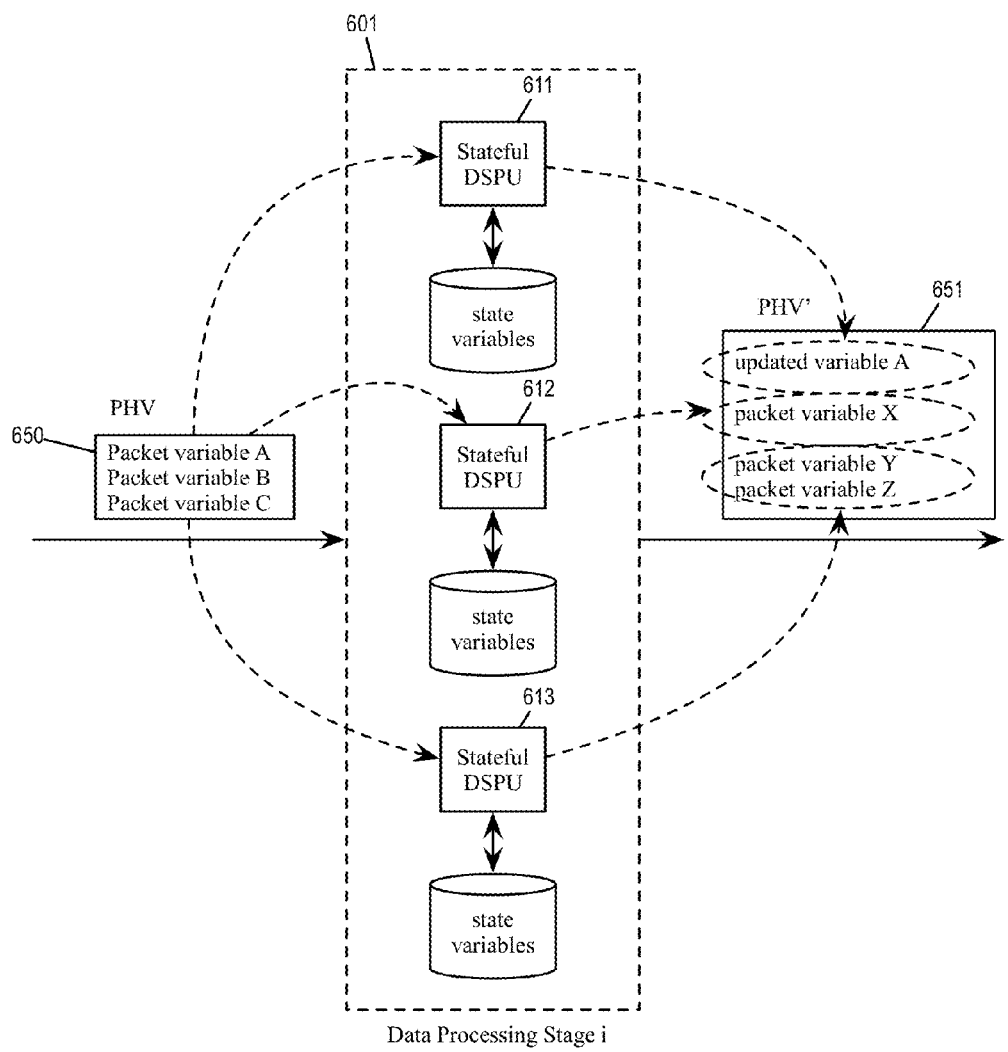
FIG. 6 illustrates a data processing stage having multiple DSPUs operating in parallel.

FIG. 6 illustrates a data processing stage 601 having three DSPUs 611, 612, and 613 operating in parallel. The data processing stage receives a PHV 650 from a previous stage (or a parser) and produces a derivative PHV 651 (PHV') for a subsequent stage. The DSPUs 611-613 each uses the packet variables to produce result and contribute to the output derivative PHV 651 of the data processing stage 601.

The PHV 650 includes packet variables A, B, and C. Each of the DSPUs 611-613 uses some or all of these packet variables along with its own state variables to perform computation. The DSPU 611 updates the packet variable A. The DSPU 612 outputs a new packet variable X. The DSPU 613 outputs new packet variables Y and Z. The data processing stage includes packet variables A, X, Y, and Z in the output derivative PHV 651 (PHV').

Several more detailed embodiments of the invention are described below. Section I describe a match-action pipeline that includes DSPUs in its match-action stages. Section II describes an implementation of the DSPU hardware in detail. Section III describes a compiler for compiling a program into configurations or instructions for different DSPUs in a packet-processing pipeline. Section IV provides several example datapath algorithms that are implemented by using DSPUs. Section V describes an electronic system with which some embodiments of the invention are implemented.

I. DSPU in Match-Action Packet Switch Pipeline

In some embodiments, the packet-processing pipeline is a network switch that modifies and switches packets, as well as collects information on packets, ports, etc., for the purpose of managing the switch and the network. In such a pipeline, packets are matched against a set of rules, and matching rules have corresponding actions that can transform or route the packet. In some embodiment, the match-action operations of the switch are defined by OpenFlow protocol. Further descriptions of match-action packet processing (such as OpenFlow) and the various types of tables/logical memories can be found in U.S. Patent Application Publication No. 2014/0241361 and U.S. Patent Application Publication No. 2014/0241358. U.S. Patent Application Publication No. 2014/0241361 and U.S. Patent Application Publication No. 2014/0241358 are herein incorporated by reference.

Figure 7:
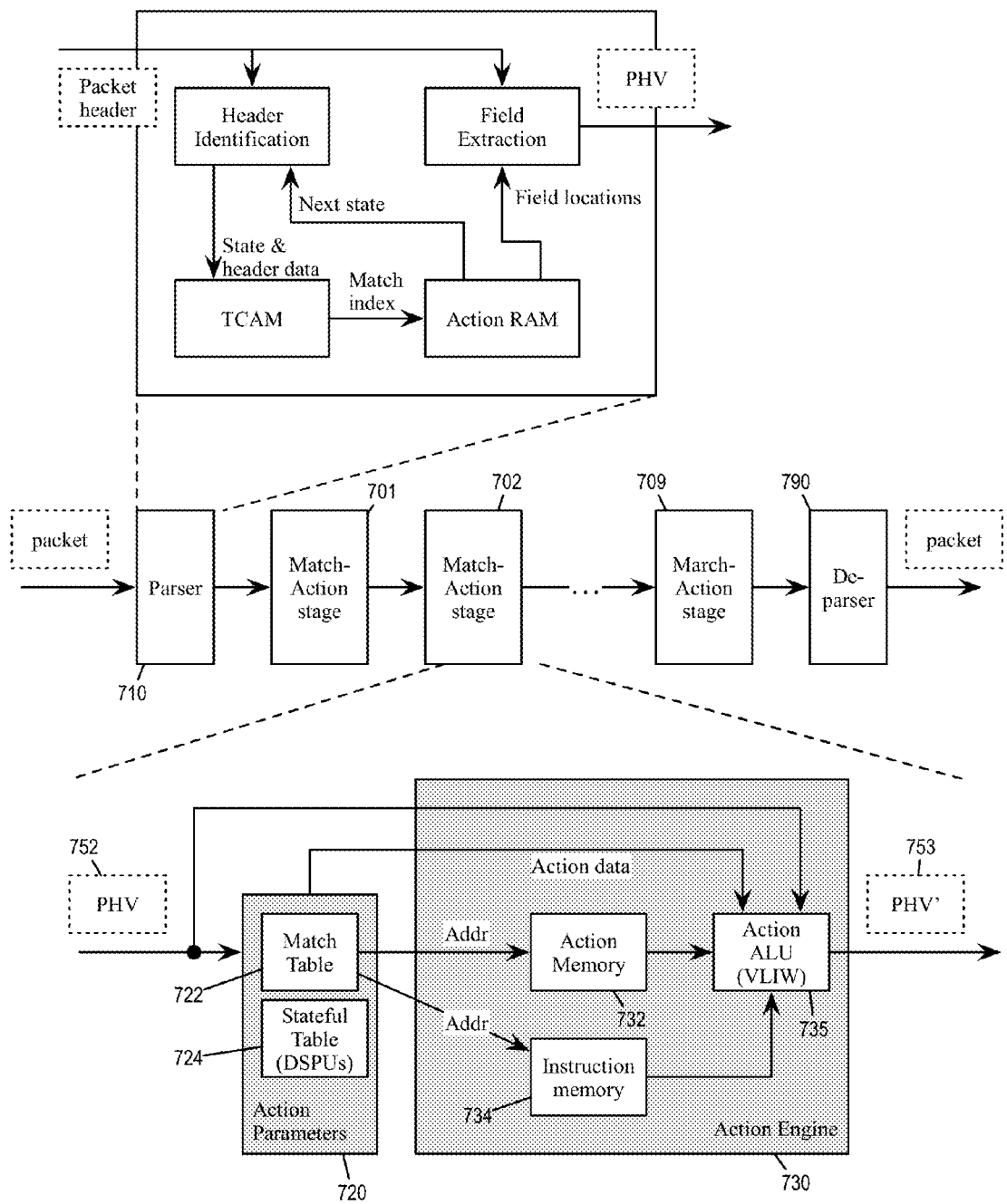
FIG. 7 illustrates a packet-processing pipeline that implements match-action packet processing, where the pipeline includes match-action stages having DSPUs.

In some of these embodiments, the packet-processing pipeline includes a number of match-action stages, each of these match-action stages being a data processing stage that includes a set of DSPUs. FIG. 7 illustrates a packet-processing pipeline 700 that implements match-action packet processing, where the pipeline includes match-action stages having DSPUs.

As illustrated, the packet processing pipeline 700 includes a parser 710, a series of match-action stages 701-709, and a deparser 790. The parser 710 parses the packet headers of incoming packet and creates a packet header vector (PHV) for the first match-action stage 701. In some embodiments, the parser 710 includes modules such as a header identification module, a TCAM module and a field extraction module for identifying various fields of the packet header and extracts the corresponding field data to create the PHV for the first match-action stage 701.

Each match-action stage (such as the stage 702) includes an action parameters module 720 and an action engine 730. The action parameters module receives a PHV 752 that comes from a previous stage (in this instance the stage 701) and produces an action data for the action engine 730. The action parameters module 720 also produces an address for the action engine 730.

The action parameters module 720 includes a match table 722 and a stateful table 724. The match table 722 is for matching the incoming PHV 752 against a set of rules and for indicating the result of the matching. The stateful table 724 is implemented by one or more DSPUs. The output of the stateful table 724 and the output of the match table 722 together form the action data to the action engine 730. The match table 722 also provides an address to the action engine 730 that is used by the memory structures therein.

The action engine 730 includes an action memory 732, an instruction memory 734, and an action ALU 735, which is a very large instruction word (VLIW) processor. The action ALU 735 executes instructions from the instruction memory 734 and performs actions described by the action memory 732 as well as by the action data provided by the action parameters module 720 (including outputs of both the match table 722 and the stateful table 724). In some embodiments, such output of the action engine/action ALU is for specifying actions such as transformation or routing that are to be taken with regard to the packet. The output of the action ALU forms a derivative PHV (PHV') 753 for the next match-action stage. Consequently, the output of the DSPUs in the stateful table 724 can be configured to become the PHV' output of the match-action stage 702.

Figure 8:
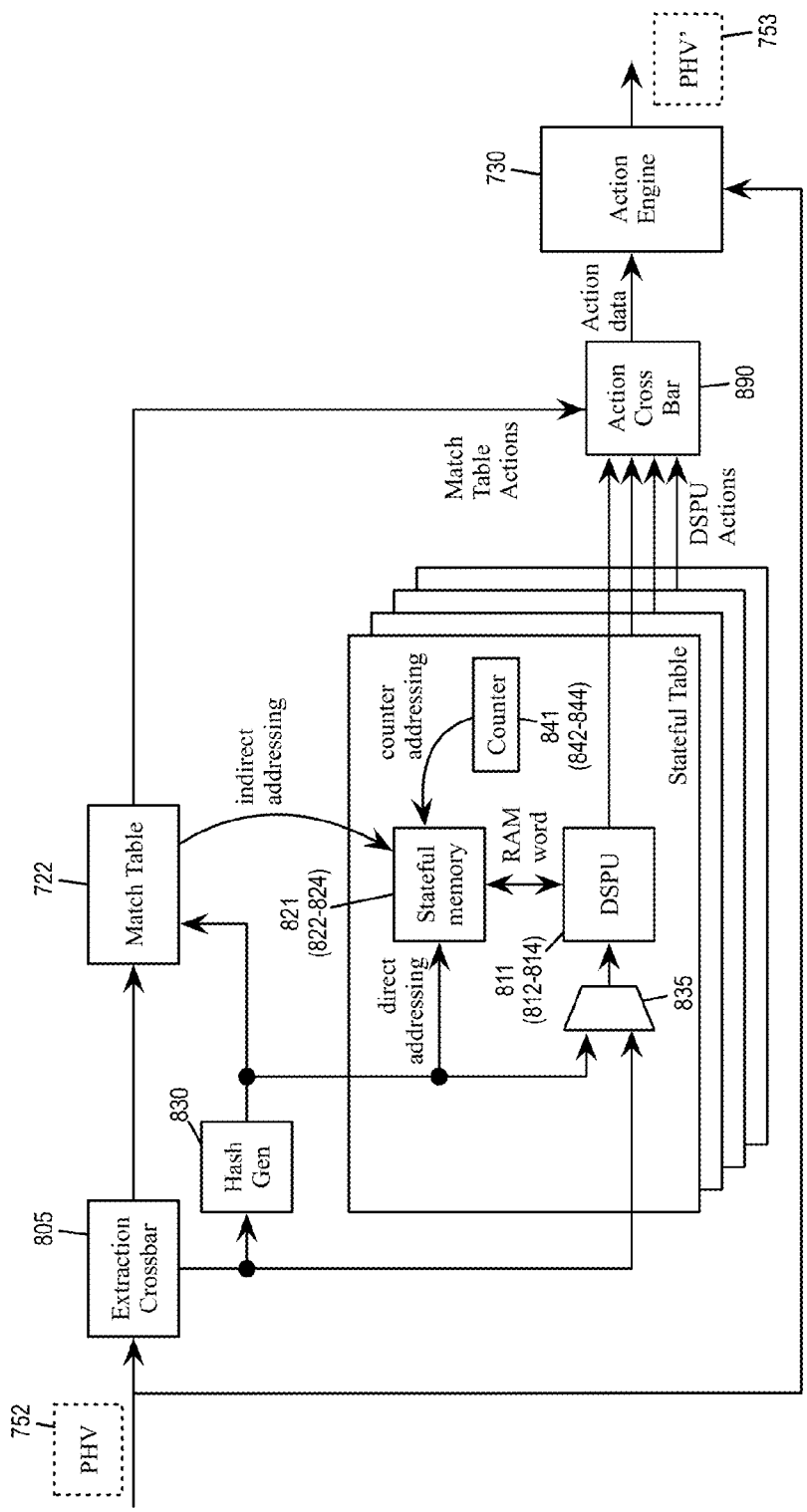
FIG. 8 illustrates an action parameters module of a match-action stage.

FIG. 8 illustrates the action parameters module 720 in greater detail. As illustrated the actions parameters module 720 includes the match table 722 and the stateful table 724. In addition, the action parameters module 720 also includes an extraction cross bar 805, a hash generator 830, and an action crossbar 890.

The extraction crossbar 805 receives incoming PHV and is configured to extracts various data fields for the match table 722 and the stateful table 724. The hash generator 830 also receives extracted data fields from the extraction crossbar 805 and produces a hash value that is used by the match table 722 and the stateful table 724 as addresses. The match table 722 uses the address supplied by the hash generator 830 as a key and the data extracted by the extraction crossbar 805 to produce an action (match table actions) data for the action engine 730.

The stateful table 724 includes a set of DSPUs 811-814 and their corresponding set of stateful memories 821-824. In some embodiments, the stateful table 724 can be regarded as a set of stateful tables, each stateful table having one DSPU and one corresponding state memory. Each DSPU stores its stateful variables in its corresponding stateful memory (e.g., the DSPU 811 maintains and uses stateful variables that are stored in the stateful memory 821, the DSPU 812 maintains and uses stateful variables that are stored in the stateful memory 822, etc.)

Each DSPU in the stateful table 724 performs computation on extracted PHV data from the extraction crossbar 805 to produce an action (DSPU action) for the action engine 730. This computation is also based on state information stored in its corresponding state memory, and is used to update the state information therein. In some embodiments, the programming of the DSPU uses the extracted PHV data as packet variables, and state information stored in the corresponding state memory as stateful variables. In some embodiments, the DSPU receives its input from a AND-OR multiplexer 835 where the input from the hash 830 and the input from the crossbar 805 can be byte masked and then OR'ed together. This allows the DSPU to use a combination of hash/PHV as a single operand or across two input operands.

The action crossbar 890 collects the action data produced by the match table 722 (match table actions) and the action data produced by the stateful table 724 (DSPU actions produced by each of the DSPUs) to produce a combined, final action data of the action parameters module 720 to the action engine 730. In some embodiments, the action crossbar 890 is statically configured to select from various portions or fields of the match table output and/or the stateful table output.

FIG. 8 also illustrates various addressing modes that are used to address the state memory of a DSPU. In some embodiments, the programming of a DSPU determines which addressing mode to use when accessing its corresponding state memory. As mentioned earlier, a DSPU in some embodiments uses a PHV derived value (e.g., hash) as the address to access state variables. Doing so ensures that the DSPU uses only the stateful variables that relevant to the packet/PHV being processed. Correspondingly, each DSPU (811-814) uses the output of the hash generator 830 as address of its corresponding state memory (821-824). This is also the address used by the match table to perform its match operations in some embodiments. This addressing mode is referred to as direct addressing or hash addressing. In some embodiments, the hash value used as address for the stateful memory is not the same as the hash value used as address for the match table 722.

In addition to direct addressing, a state memory can also be addressed by the output of the match table 722 based on the result of a match operation. This is referred to as indirect addressing in some embodiments. In some embodiments, each DSPU (811-814) has a corresponding counter (841-844), and the counter's output is used as address of the corresponding state memory. This is referred to as counter addressing in some embodiments. Different embodiments increment the counter differently. In some embodiments, the counter 840 acts as a timestamp provider and increments every clock cycle. In some embodiments, the counter 840 increments once every packet. In some embodiments, the programming of the DSPU controls the operations (e.g., increment, reset) of the counter.

II. Hardware Implementation of DSPU

Figure 9:
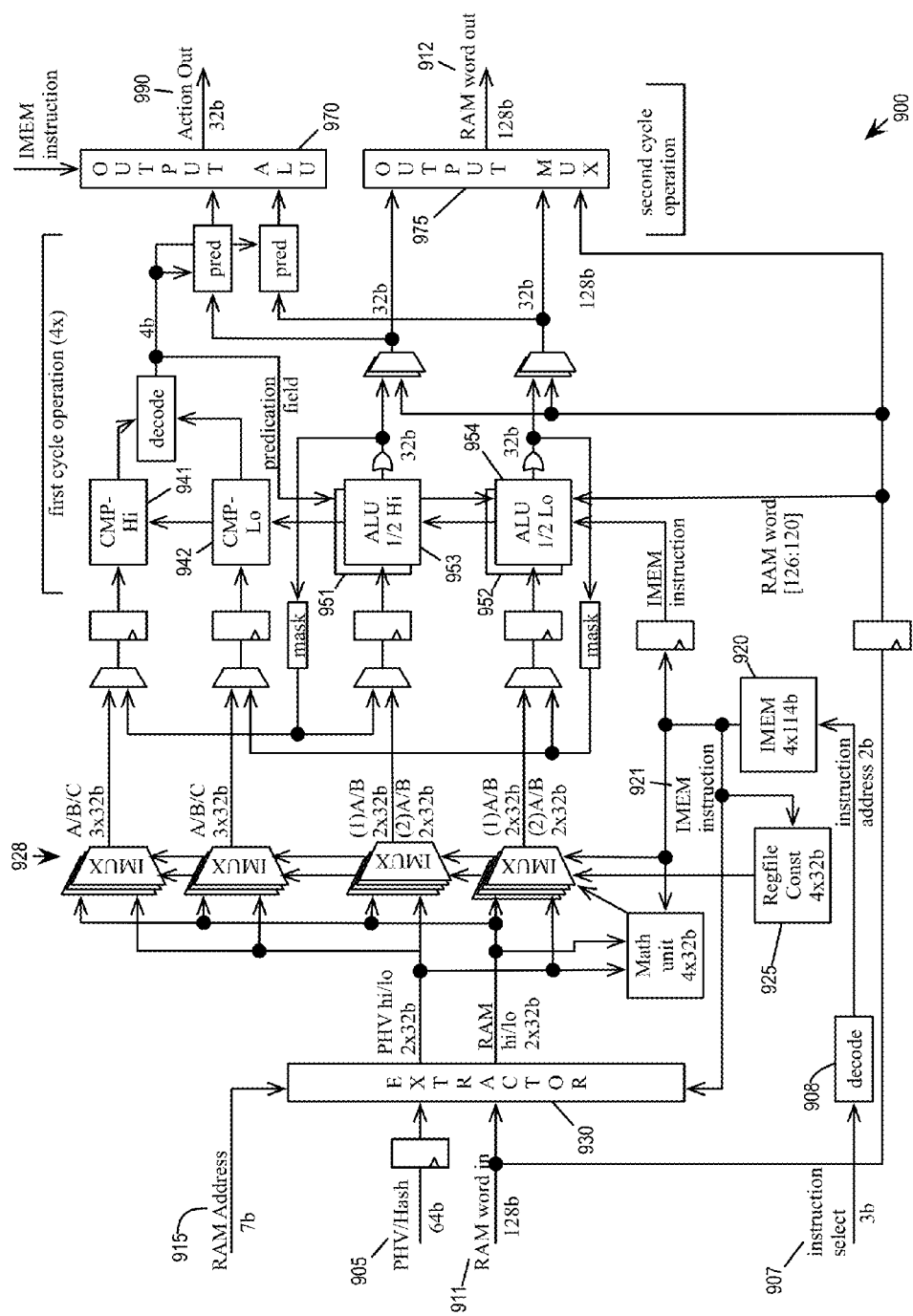
FIG. 9 illustrates a block diagram of a DSPU.

For some embodiments, FIG. 9 illustrates a block diagram of a data-plane stateful processing unit (DSPU) 900. In some embodiments, each of the DSPUs 811-814 is based on the hardware implementation of the DSPU 900. The DSPU uses and maintains its own set of state variables in a state memory while performing a new operation every clock cycle.

As illustrated, the DSPU 900 receives a 64-bit PHV 905 (which is a combination of hash and PHV from the multiplexer 835) and a 128-bit RAM word input 911. The DSPU in turn produces a 32-bit action data output 990 and a 128-bit RAM word output 912. The RAM word input 911 is from the corresponding state memory of the DSPU 900 and the RAM word output 912 is to the corresponding state memory of the DSPU 900. The corresponding state memory (not illustrated) of the DSPU 900 stores the stateful variables and the RAM word input/output are for reading and writing those stateful variables. The action data output 990 is what goes to the action engine (e.g., 730) and become the derivate PHV output of the match-action stage.

The DSPU 900 includes a 4×114 bit instruction memory (IMEM) 920 that stores the programming or instructions of the DSPU. It outputs a instruction word 921 whose various bit fields controls various components of the DSPU, including the operand multiplexers 928, the comparators 941-942, the ALUs 951-954, the math unit 930, and the output ALU 970. A 3-bit control signal 907 "instruction select" determines which word of the instruction memory is to be used at any given clock cycle through a decoder 908. In some embodiments, this instruction select is a statically configured signal. In some embodiment, the match table (e.g., 722) provides this signal based on which flow entry has been matched. The output of the IMEM 920 is provided to the various components of the DSPU on each clock cycle to determine their operation at that clock cycle.

The incoming PHV 905 and the RAM word input 911 are fed to an extractor 915, which selects the correct portion of the PHV 905 and the RAM word 911 for computation by various components. Specifically, the extractor selects which 32-bit portions of the 64-bit PHV 905 and of the 128-bit RAM word input 911 are to be provided to the computational components of the DSPU 900. The extractor 915 makes this selection based on the instruction provided by the IMEM 920 as well as by the least significant 7 bits for the address for the stateful memory.

The DSPU 900 has several computational components for performing its computational operations. These components include comparator 941 (compare-hi or CMP-Hi), comparator 942 (compare-lo or CMP-Lo), ALU 951 (ALU-1-Hi), ALU 952 (ALU-1-Lo), ALU 953 (ALU-2-Hi), and ALU 954 (ALU-2-Lo). These computation components use the output of the extractor 915 (i.e., the RAM word 911 and the PHV 905) as operands. Operands of the computation components can also come from a preloaded, read-only register file 925 or from the immediate data of the instruction memory 920. ALU-2-Lo 962 in particular has access to a math unit 930 (that includes a 4×32b math table in some embodiments) for computing low resolution functions such as $x^2$, $1/x$, $1/x^2$, $sqrt(x)$, $1/sqrt(x)$, etc. Each comparator 941 and 942 has three operands, while each ALU has two operands. Each of the comparators and the ALUs operate according to its own instruction from the output of the IMEM 920. The instructions for the two comparator 941 and 942 use three different source for operands: state memory (from RAM word input 911), PHV (905), and constant (from IMEM 920 or register file 925), while the state-update ALU instructions use two sources of operands: state memory, PHV, or constant. The operands to the comparators 941-942 and ALUs 951-954 are provided by an array of operand multiplexers (IMUXs) 928, which are controlled by the instruction word 921.

The output of the comparators 941 and 943 are used to predicate on or off each of the ALUs 951-954 such that only the output of the ALUs that are predicated on is allowed to reach the output of the DSPU 900. The predication of the ALUs allows DSPU to each make a three way choice regarding state variables: one of two different update operations or no update. If both ALU-1-Hi and ALU-2-Hi are predicated on then their outputs are simply OR'ed for a combined ALU-Hi output. Likewise, if both ALU-1-Lo and ALU-2-Lo are predicated on then their outputs are simply OR'ed for a combined ALU-Lo output. The predication of ALUs will be further described by reference to FIG. 10 below.

The DSPU 900 has two output modules for determining the outputs of the DSPU: an output ALU 970 for determining the action data output 990 (destined for the action engine and the output PHV); and an output multiplexer 975 for determining the RAM word output 912 (destined for the stateful memory). The output ALU 970 is actually a multiplexer that selects among the outputs of ALUs 951-954, the comparators 941-942, the PHV 905, and the RAM word input 911. The output MUX 975 allows the output of ALUs 951-954 to become RAM word output 912 and thereby update the stateful information stored in the stateful memory. However, if the ALUs are predicated off, then the RAM word input 911 goes through to become RAM word output 912, allowing the stateful information in the state memory to remain at their previous value.

The DSPU 900 executes up to 5 instructions in each operation. These consist of 4 instructions performed in parallel in the first clock cycle, and a fifth instruction in the second cycle. The four first cycle instructions are two compares (at comparators 941 and 942) and two ALU operations (at ALUs 951-954) to update the stateful memory word. The fifth instruction, in the subsequent cycle, provides an output to the action ALU based on the outputs of the prior 4 instructions. The result of the compares in the first cycle can be used to predicate the execution of the two other operations in the same cycle, as well as provide inputs to the second cycle operation.

In some embodiments, data inputs (PHV and RAM word input from stateful memory) are double-wide to support instructions that pairs Hi and Lo comparators and instructions that pairs Hi and Lo ALUs. For 32-bit operations, a 64-bit input on each of two operand sources provides pairs of 32-bit data for the instructions. Some embodiments support 16-bit and 8-bit operations, with 32 bits and 16 bits of data provided by each operand. Some embodiments also provide single width operations. For single 32-bit instructions, both the state memory data width and ALU data width are 32 bits. For double 32-bit instructions, the memory data width is 64 bits while the ALU data size indicated by the instruction is 32 bits. In all cases, the state memory delivers a 128-bit word (911) to the DSPU (900), which extracts the width of data it is expecting, using the least significant bits of the address to the state memory.

Table 1 below lists operands of various computation components. For each operand, the table lists the possible sources of data for that operand. The instruction word from the IMEM 920 determines which of the possible sources should serve as the operand.

TABLE 1

Operands of Computation Components in the DSPU

| Computation Component | Operand | Available Sources |
|---|---|---|
| CMP-Hi | A | Stateful memory hi |
| CMP-Lo |  | Stateful memory lo |
|  | B | PHV hi |
|  |  | PHV lo |
|  | C | Instruction constants (4b signed) |
|  |  | Register file constant (32b signed) |
| ALU-1-Hi | A | Stateful memory hi |
| ALU-2-Hi |  | Stateful memory lo |
| ALU-1-Lo |  | instruction constant (4b signed) |
|  |  | register file constant (32b signed) |
|  | B | PHV hi |
|  |  | PHV lo |
|  |  | instruction constant (4b signed) |
|  |  | register file constant (32b signed) |
| ALU-2-Lo | A | Stateful memory hi |
|  |  | Stateful memory lo |
|  |  | instruction constant (4b signed) |
|  |  | register file constant (32b signed) |
|  | B | PHV hi |
|  |  | PHV lo |
|  |  | instruction constant (4b signed) |
|  |  | register file constant (32b signed) |
|  |  | math function of: |
|  |  | stateful-memory hi |
|  |  | stateful-memory lo |
|  |  | PHV hi |
|  |  | PHV lo |
| ALU-output | A | (Previous) Stateful memory hi |
|  |  | (Previous) Stateful memory lo |
|  |  | PHV-hi |
|  |  | PHV-lo |
|  |  | ALU-hi output |
|  |  | ALU-lo output |
|  |  | 4b compare output |

"Stateful memory hi" and "Stateful memory lo" are Hi and Lo (i.e., most significant and least significant) halves of the RAM word input 911. PHV-hi and PHV-lo are Hi and Lo (i.e., most significant and least significant) halves of the PHV 905. Instruction constant is the immediate data provided by the instruction word 921 from IMEM 920. Register file constant is the output of the preloaded register file 925. The math function is the output of the math unit 930. ALU-hi output is the OR'ed result of the predicated output of ALU-1-hi and ALU-2-hi. ALU-lo output is the OR'ed result of the predicated output of ALU-1-lo and ALU-2-hi.

As illustrated in the FIG. 9 and in Table 1, each comparator 941 and 942 is capable of computation of three operands A, B, and C. In some embodiments, the comparator is implemented as a three operand adder, implementing: ±A ±B +C, where A and B are operands whose signs are optionally inverted (e.g., 2's complement) by the instruction word. This allows operations such as "current_time− previous_time>threshold". In this example, the operation would be A=previous_time B=current_time C=−threshold (the threshold can be a constant in some embodiments) −A+B+C>0

As mentioned, the outputs of the comparators 941 and 942 are used to predicate on or off the ALUs. This predication allows conditional computation statements such as "X= cond ? A: B" to be executed quickly in the data-plane with little hardware cost. This mechanism can therefore be used to conditionally compute packet variables or to conditionally update state variables. When conditionally updating a state variable, at least three different types of results are possible, namely (i) to update according to output of ALU1, (ii) to update according to output of ALU2, or (iii) to keep the same value.

Figure 10:
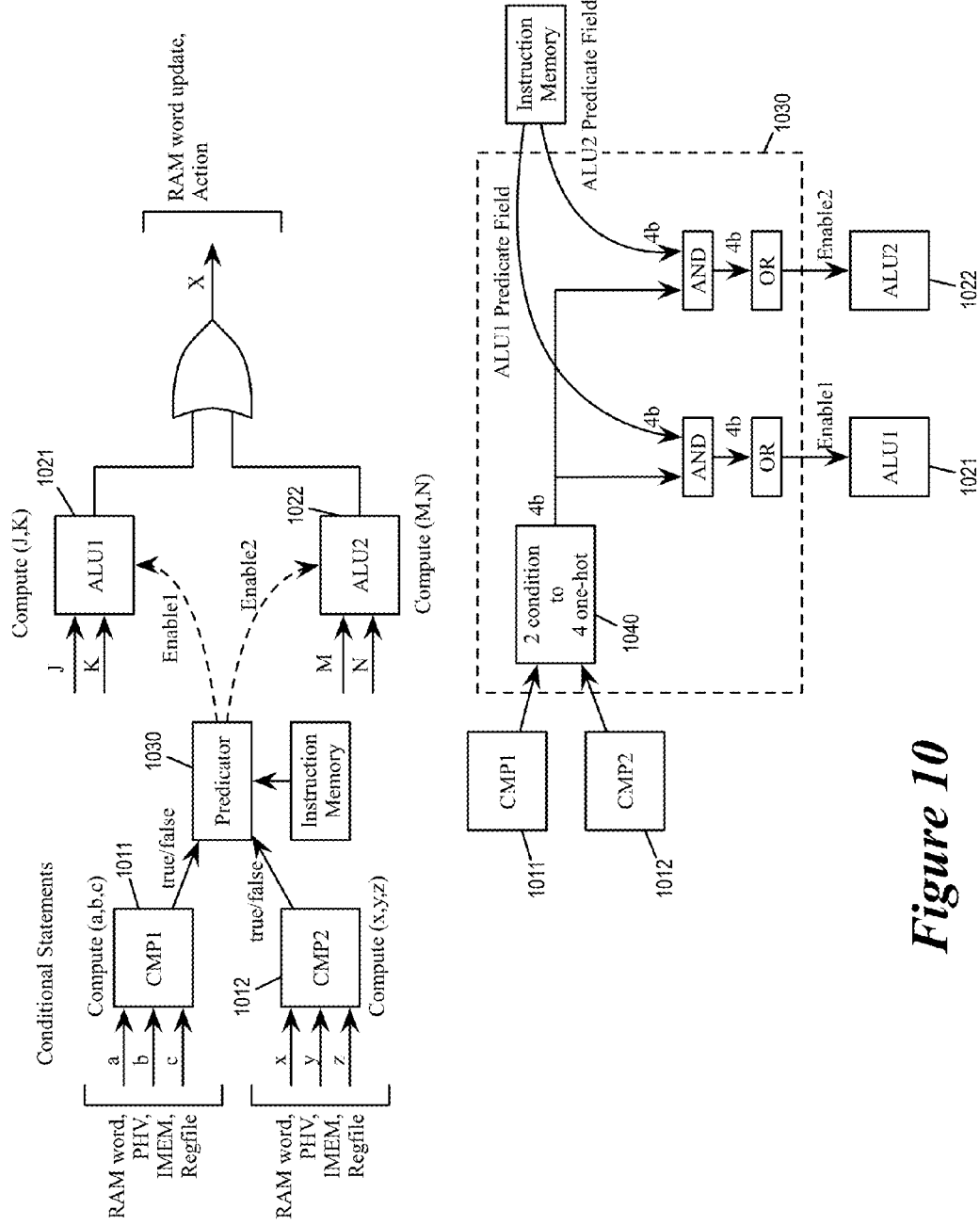
FIG. 10 illustrates conditional predication of ALU outputs in DSPUs.

FIG. 10 illustrates conditional predication of ALU outputs in DSPUs for some embodiments. The figure conceptually illustrates a simplified DSPU 1000 having comparators 1011-1012 (CMP1 and CMP2) and ALUs 1021-1022 (ALU1 and ALU2). Each comparator performs a computation based on a set of operands (e.g., 3 operands) and produce a 1 bit true/false output. A predicator 1030 then collects the 1 bit true/false output and determine which ALUs to enable, i.e., to predicate on. The outputs of the ALUs 1021 and 1022 are OR'ed together to produce output (X) for PHV, stateful variable update, etc. If ALU1 is predicated on and ALU2 is predicated off, then output of ALU1 is used. If ALU1 is predicated off and ALU2 is predicated on, then the output of ALU2 is used. If both ALU1 and ALU2 are predicated off, then something else would be outputted, e.g., all 0s, or the current value of the RAM word (so no update).

FIG. 10 also illustrates the predicator 1030 in greater detail for some embodiments. As illustrated, a 2-to-4 one hot encoder 1040 encodes the two true/false outputs from the comparators 1011 and 1012 into 4 one-hot bits, i.e., "0001", "0010", "0100", or "1000". The predicator 1030 also receives a 4-bit predicate field for ALU1 and a 4-bit predicate field for ALU2 from the instruction word (i.e., the current output of the instruction memory 920).

Together with the 4-bit one-hot signal from encoder 1040, the predicate field of ALU1 determines whether ALU1 is to be predicated on/off, and the predicate field of ALU2 determines whether ALU2 is to be predicated on/off. Specifically, the 4 bits of the ALU1 predicate field act as a mask on the 4-bit one-hot signal (i.e., bit-wise AND). If the masked result is non-zero, then ALU1 is predicated on. Likewise for ALU2. Thus, for example, if the 4-bit one-hot signal is "0010", ALU1 predicate field is "1100" and the ALU2 predicate field is "0011", then ALU1 will be predicated off while ALU1 will be predicated on. If the 4-bit one-hot signal is "0100", ALU1 predicate field is "1010" and ALU2 predicate field is "1001", then both ALU1 and ALU2 will be predicated off. Whenever an ALU's predicate field is "0000", it will be predicated off, regardless of what is on the 4-bit one-hot signal.

As illustrated in FIG. 9, the comparators and ALUs have Hi and Lo versions. There are Hi and Lo comparators (CMP-Hi 941, CMP-Lo 942), Hi and Lo ALU-1s (ALU-1-Hi 951 and a ALU-1-Lo 952), and Hi and Lo ALU-2s (ALU-2-Hi 953 and a ALU-2-Lo 954). In some embodiments, the Lo and Hi comparators and ALUs can be configured (e.g., by instruction word) to perform two independent computations to produce/update two different variables (packet or state variables) each clock cycle. In some embodiments, the Lo and Hi comparators and ALUs can be configured (e.g., by instruction word) to jointly perform one double-width computation in each clock cycle.

Figure 11:
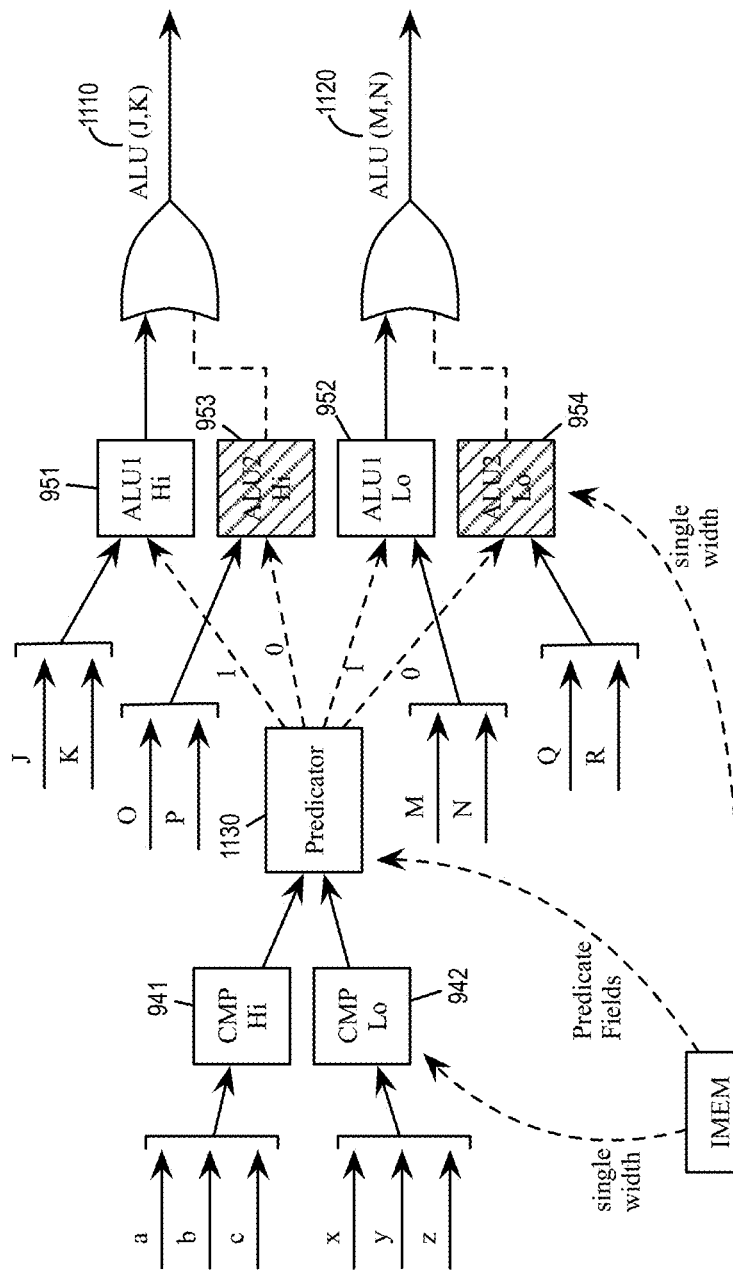
FIG. 11 illustrates Lo and Hi ALUs/comparators configured to perform two independent single width computations in each clock cycle.

FIG. 11 illustrates Lo and Hi ALUs/comparators configured to perform two independent single width computations in each clock cycle. The comparators 941-942 and ALUs 951-954 are configured for single-width operations by the instruction word 921.

As illustrated, each of the ALUs is operating on its own set of operands. Specifically, ALU-1-Hi 951 is operating on operands J and K, ALU-1-Lo 952 is operating on operands O and P. Operands J and K are not Hi/Lo counterparts of operands O and P. ALU-2-Hi 953 is operating on operands M and N, and ALU-2-Lo 954 is operating on operands Q and R. Operands M and N are not Hi/Lo counterparts of operands Q and R.

CMP-Hi 941 receives three operands "a", "b", and "c" and computes one true/false condition. CMP-Lo 942 receives three operands "x", "y", and "z" and computes another true/false condition. These two compare operations are independent of each other as the comparators are configured for single-wide operations. A predicator 1130 collects these two conditions in order to determine which of the four ALUs 951-954 should be predicated on. This predication is based on predicate fields in the instruction word 921 for each of the ALUs as described by reference to FIG. 10 above. In this example, ALU1-Hi and ALU1-Lo are predicated on while ALU2-Hi and ALU2-Lo are predicated off. Consequently, only outputs of ALU-1-Hi and ALU-1-Lo go through the OR gates 1110 and 1120.

Since the ALUs are configured to perform single width computations in this example, the outputs of ALU-1-Hi and ALU-1-Lo represent the results of two different, independent calculations. ALU-1-Hi's calculation is based on operands J and K, while ALU-1-Lo's calculation is based on operands M and N. These two computations can be for updating two different state variables. They can be for assigning two different packet variables. They can also be used for updating one state variable and for assigning one packet variable. In some embodiments when the DSPU is updating two state variables in the same clock cycle, the two state variables are stored on the same stateful memory RAM word (Hi and Lo portions).

Figure 12:
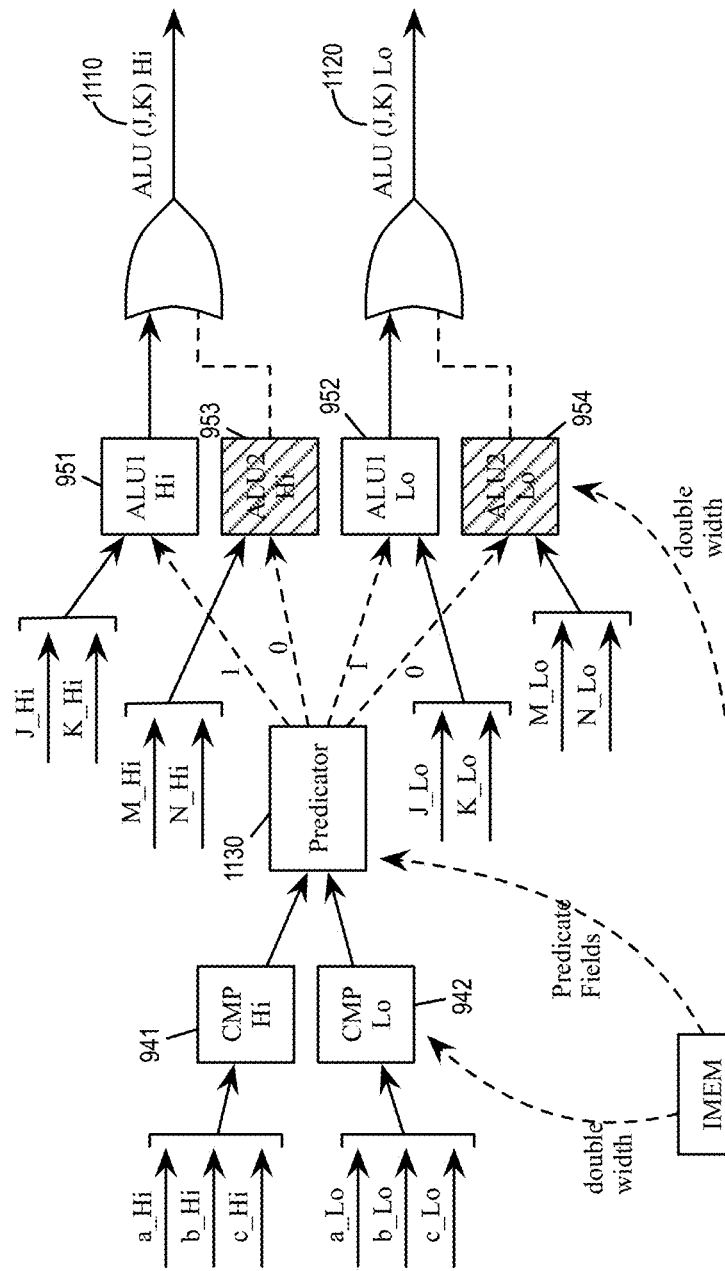
FIG. 12 illustrates a double-wide computation by a DSPU.

FIG. 12 illustrates a double-wide computation by a DSPU. The figure illustrates the operations of comparators 941-942 and ALUs 951-954 during double-width operations.

In some embodiments, a double-wide computation uses both Hi and Lo computation components (ALUs and comparators) jointly to perform computation whose operands are twice as wide. Hi and Lo ALUs can jointly perform one double-wide ALU computation. Hi and Lo comparators can also jointly perform one double-wide computation to produce one true/false condition. In some embodiments, the Hi and Lo counterparts are linked by arithmetically (e.g., linking signals such as carry chains).

As illustrated, ALUs 951-954 are configured to perform double wide computations, specifically, ALU-1-Hi and ALU-1-Lo are jointly performing one double-wide computation, and ALU-2-Hi and ALU-2-Lo are jointly performing one double-wide computation. ALU-1-Hi receives Hi part of operands J and K, while ALU-1-Lo receives Lo part of operands J and K. Likewise, ALU-2-Hi receives Hi part of operands M and N, while ALU-2-Lo receives Lo part of operands M and N.

CMP-Hi 941 and CMP-Lo 942 respectively receive Hi and Lo parts of three operands "a", "b", and "c". The CMP-Hi and CMP-Lo then jointly perform one double-wide comparison operation based on operands "a", "b", and "c". The predicator 1130 collects the true/false condition indicators from both CMP-Hi and CMP-Lo and determines which of the four ALUs 951-954 should be predicated on. This predication is also based on predicate fields in the instruction word 921 for each of the ALUs as described by reference to FIG. 10 above. In this example, ALU1-Hi and ALU1-Lo are predicated on while ALU2-Hi and ALU2-Lo are predicated off. Consequently, only outputs of ALU-1-Hi and ALU-1-Lo go through the OR gates 1110 and 1120.

Since the ALUs are configured to perform double wide computations in this example, the outputs of ALU-1-Hi and ALU-1-Lo represent the result of one contiguous double-wide calculation based on operands J and K. Specifically, ALU-1-Hi outputs the Hi part of the computation result while ALU-1-Lo outputs the Lo part of the computation result. This result can be used for updating one state variable or for assigning one packet variable.

In the example illustrated in FIG. 12, both comparators and all of the ALUs are in double-wide computation mode. However, in some embodiments, for a given operation in a given clock cycle, the comparator can be in single wide while the ALUs are in double wide and vice versa. In some embodiments, ALU1 and ALU2 can also be in different mode (e.g., ALU1-Hi and ALU1-Lo are in double wide mode while ALU2-Hi and ALU2-Lo are in single wide mode.)

Figure 13:
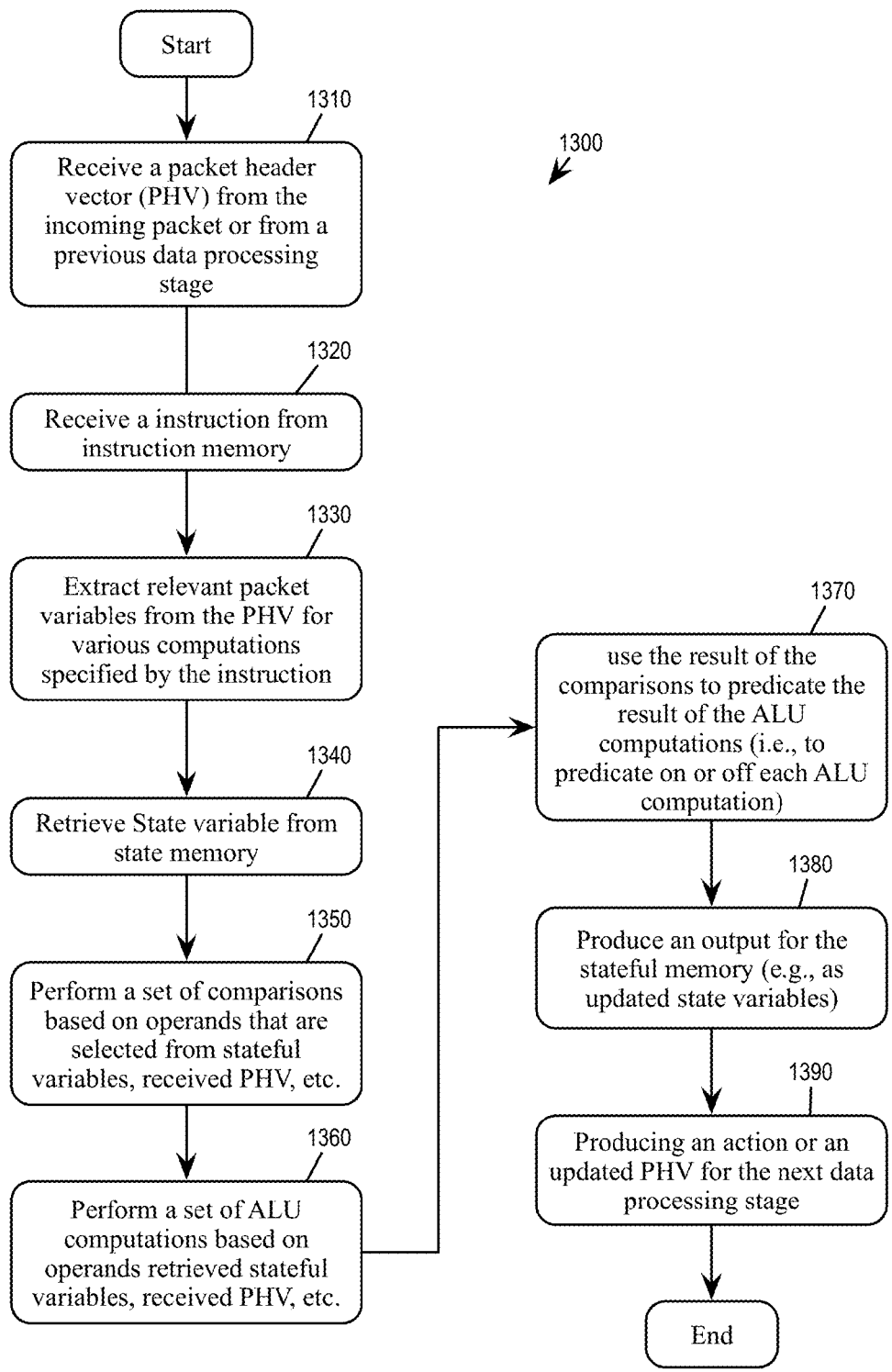
FIG. 13 conceptually illustrates a process performed by a DSPU when statefully processing a PHV.

FIG. 13 conceptually illustrates a process 1300 performed by a DSPU when statefully processing a PHV. The process starts when it receives (at 1310) a packet header vector (PHV) that is parsed from the incoming packet or from a previous data processing stage. The process then receives (at 1320) an instruction word from the instruction memory, which determines the operations of various components of the DSPU. The process then extracts (at 1330) relevant packet variables from the PHV for various computations as specified by the instruction word.

The process then retrieves (1340) state variable from the state memory. As discuss above by reference to FIG. 8, in some embodiments, the addressing to the state memory can be based on one of several modes, including a direct addressing mode that uses a hash value of the PHV as address, a indirect addressing mode that uses match table output as address, and a counter addressing mode that uses a counter value as address. In some embodiments, a class of packets having a same PHV hash value would share a common set of state variables.

Next, the process performs (at 1350) a set of comparisons based on operands that are selected from state variables (e.g., RAM word input 911), packet variables (from PHV), and constant values (from e.g., instruction word 921 or from register file 925). In some embodiments, each comparison operation has three operands. In some embodiments, the comparison operations can be single-wide or double-wide.

The process then performs (at 1360) a set of ALU computations based on operands that are selected from state variables, packet variables (from PHV), and constant values. In some embodiments, each ALU operation has two operands. In some embodiments, the ALU operations can be single-wide (two independent operations by Hi and Lo ALUs) or double-wide (one double-wide operation jointly by Hi and Lo ALUs).

Next, the process uses (at 1370) the result of the comparisons to predicate the result of ALU computations. In some embodiments, whether a particular ALU in the DSPU is predicated on or off is also based on the predication field for the particular ALU in the instruction word. The predication of ALUs by comparators is described in detail by reference to FIG. 10 above.

The process then produces (at 1380) an output for the state memory based on the ALU outputs that are predicated on. Such an output can include an updated stateful variable, or the previous/currently existing content of the stateful memory at that location (i.e., no change to the state information). The process also produces (at 1390) an action data or an updated PHV for the next data processing stage. Such output includes packet variables in some embodiments. The process 1300 then ends.

III. Compiler for Data-Plane Algorithms

Some embodiments provide a compiler for converting text-based source code into configurations or sets of instructions for individual DSPUs in a pipeline. The DSPUs in a packet-processing pipeline, when configured by these configurations or sets of instructions, would perform data-plane algorithms specified by the text-based source code.

Figure 14:
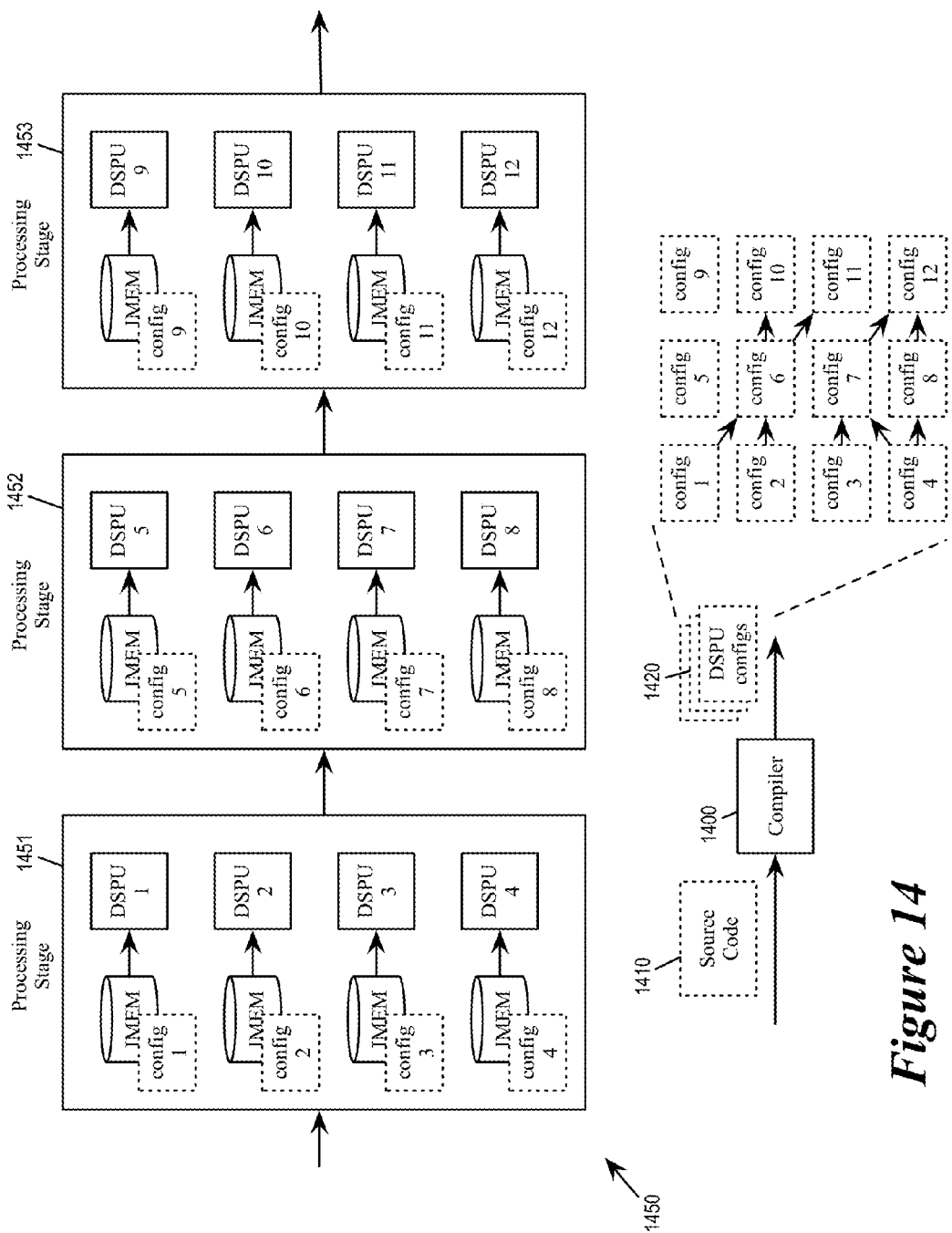
FIG. 14 illustrates the configuration of a packet-processing pipeline by compiling a source code into configurations for individual DSPUs.

For some embodiment, FIG. 14 illustrates the configuration of a packet-processing pipeline by compiling a source code into configurations for individual DSPUs. The figures illustrate a compiler 1400 that compiles a source code 1410 into configurations or instruction sets. The compiled instruction sets or configurations are for DSPUs the data processing stages of a packet-processing pipeline 1450.

The packet processing pipeline 1450 has at least twelve DSPUs (DSPU 1 through DSPU 12) populating three pipelined stages 1451-1453. The pipeline stage 1451 includes DSPUs 1-4 that operate in parallel. The pipeline stage 1452 includes DSPUs 5-8 that operate in parallel. The pipeline stage 1453 includes DSPUs 9-12 that operate in parallel.

The compiler 1400 produces DSPU configurations 1420 (configs 1 through 12), each DSPU configuration for programming one DSPU (as instruction in its instruction memory). As illustrated, "config 1" is for configuring DSPU 1, "config 2" is for configuring DSPU 2, etc. The DSPU configurations are logical interdependent, i.e., some of the DSPU configurations are for performing computations that logically depend on other computations performed by DSPUs configured by other DSPU configurations. The compiler 1400 assigns the DSPU configurations to the DSPUs according to the logical dependencies between the DSPU configurations and the pipelined structure between the DSPUs.

The source code 1410 is a program of packet transactions. FIG. 16 illustrates an example program 1600 of packet transactions. In the program 1600, all packet processing happens in the context of a packet transaction (the function flowlet on line 17), a C function that takes a C struct as an argument. The struct declares the fields in a packet (lines 5-12) that can be referenced by the function body (lines 18-32). In addition, the function body can reference state variables that represent persistent state stored on the switch. These are declared as global variables at the program top level (e.g. last_time and saved_hop on lines 14 and 15).

Conceptually, the packet transaction function modifies its packet argument in place until the end of the function body, before processing the next packet. In some embodiment, the DSPU compiler forbids return statements implying that execution will always end at the end of the function body. The function body may also call out to intrinsic functions such as hash2 on lines 23 and hash3 on line 18. These represent hardware primitives provided by the abstract machine that aren't interpreted by the DSPU compiler. The compiler uses the signature of intrinsic functions to infer dependencies and supplies a canned run-time implementation for these functions, but otherwise doesn't interpret or analyze their implementation. Finally, the packet transaction's body is written in a constrained subset of C that excludes all iterative constructs in some embodiments. The function body can include if and else-if statements, but all other control transfer (break, goto, switch, return, and continue statements) is forbidden in some embodiments.

In some embodiments, the DSPU compiler forbids pointers and dynamic memory allocation. Arrays can be used as state variables, but with restrictions. While a packet transaction's body is being executed for a specific packet, all accesses to an array variable must use the same index. For subsequent packets, this index can be different. For instance, all accesses to the arrays last_time and saved_hop use the index pkt.id that is constant for each packet, but changes from one packet to the next. This restriction simplifies the treatment of arrays in the compiler, while still allowing the expression of several data-plane algorithms of practical interest.

Figure 15:
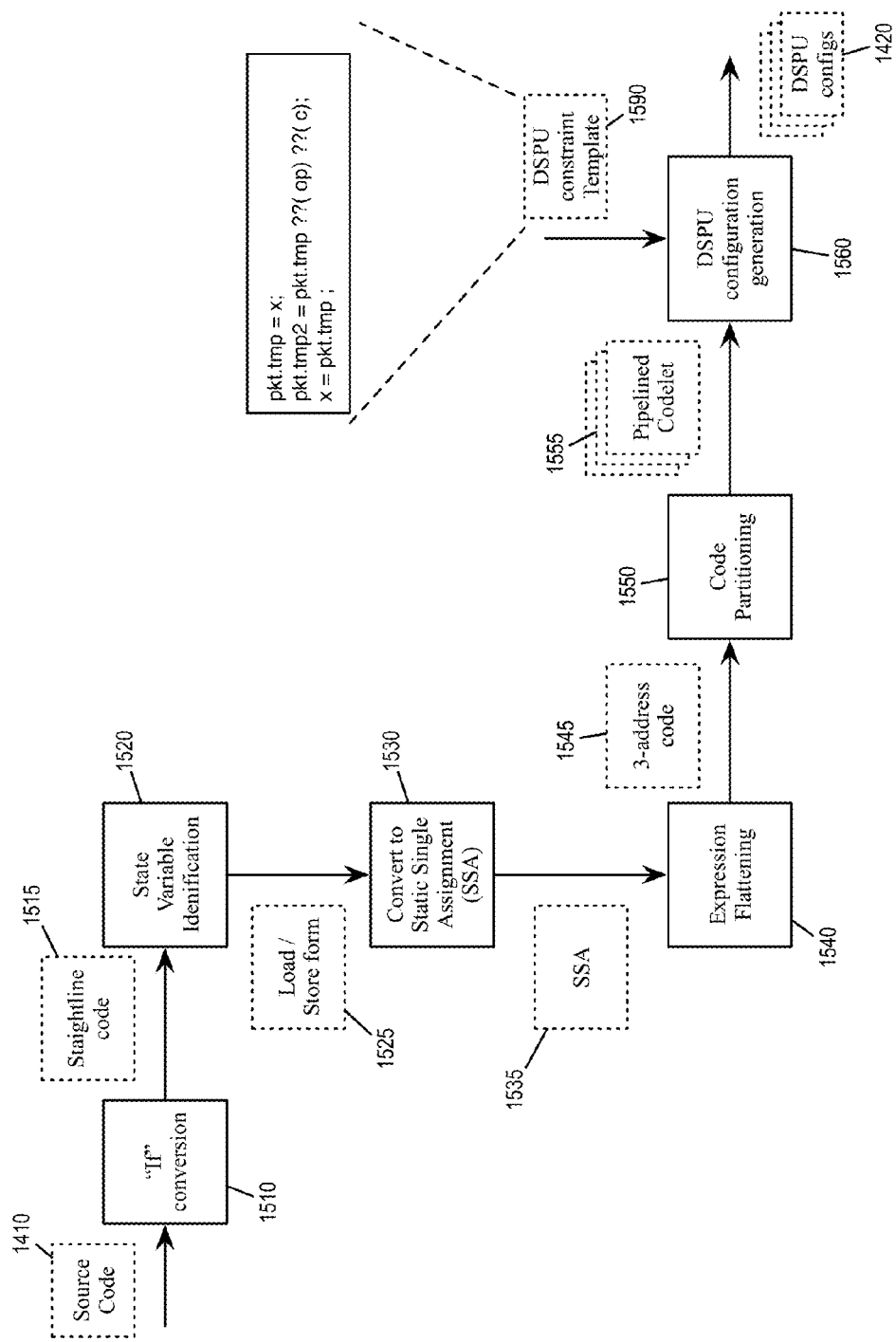
FIG. 15 illustrates the operational blocks of a DSPU compiler.

FIG. 15 illustrates the operational blocks of the DSPU compiler 1400. As illustrated, the DSPU compiler 1400 includes an if-statement conversion module 1510, a state variable conversion module 1520, a static single assignment (SSA) conversion module 1530, an expression flattening module 1540, a code partition module 1550, and a DSPU configuration generation module 1560.

The if-statement conversion module 1510 performs an "if conversion", which converts the source code 1410 into straight-line code 1515. A packet transaction's body that contains if-else statements can alter the program's control flow and complicate dependence analysis. Some embodiments therefore eliminate if-else statements by transforming them into the C conditional operator, starting from the innermost if statements and recursing outwards. This procedure is called if-conversion. FIG. 17a illustrates an example if-conversion. This transformation creates straight-line code, where control passes sequentially without branching.

The state variable identification module 1520 identifies state variables in straight-line code 1515 and converts the identified state variables into load and store assignments. State variables to be identified can include both arrays and scalars. In the example straight-line code of FIG. 17a, both last_time and saved_hop are state variables. For each state variable, some embodiments create a read flank to read the state variable into a temporary packet variable. For an array, some embodiment also move the index expression into the read flank, exploiting the fact that only one array address is accessed by each packet in valid DSPU programs. Then the compiler replaces all occurrences of the state variable with the packet temporary (i.e., loading the state variable), and creates a write flank that writes the packet temporary back into the state variable (i.e., storing the state variable). FIG. 17b illustrates a transformation of a state variable into load and store operations. In the example, the compiler identified state variable "last_time" and uses a temporary packet variable "pkt.last_time" to load the state variable and then store it back to the state variable.

The state variable identification module 1520 produces a transformed code 1525 in load-store form, in which state variables only support reads and writes, and all arithmetic happens on packet variables. Restricting the operations on state variables to only reads and writes simplifies handling of state variables for subsequent code partitioning (i.e., 1550).

The static single assignment conversion module 1530 further converts the code into static single assignment (SSA) form 1535. In SSA, every variable is assigned exactly once. To compute the SSA 1535, some embodiments replace every definition of a packet variable with a new packet variable and propagate this new packet variable until the next definition of the same variable. FIG. 17c illustrates the conversion into SSA forms. In the example, the packet variable "pkt.last_time" was originally assigned twice. It is replaced with "pkt.last_time0" and "pkt.last_time1", each of which is assigned only once.

After the state variable identification (at 1520), state variables are already in SSA form (After their flanks have been added, every state variable is written exactly once in the write flank.) Because every variable is assigned exactly once, there are no Write-After-Read or Write-After-Write dependencies; only Read-After-Write dependencies remain. This, in turn, facilitates dependency analysis in subsequent code partitioning (i.e., 1550).

The expression flattening module 1540 further converts the code into three-address form 1545. In three-address form, all instructions are either reads/writes into stateful variables or carry out packet manipulations of the form pkt.f1=pkt.f2 op pkt.f3, where op includes all arithmetic, logical, and relational operators. Some embodiments also allow either pkt.f2 or pkt.f3 to be an intrinsic function call as DSPU has hardware support for these function calls (e.g., by using the math unit 930 and the register file 925). To generate three-address code, some embodiments flatten expressions that are not already legal in three-address code, by introducing enough temporaries. FIG. 17d illustrates an example of the conversion to three-address code for some embodiments.

The flattened three-address code 1545 is one contiguous sequential code. The code partitioning module 1550 converts the contiguous sequential code in 1545 into a pipeline of codelets 1555, where each codelet is a small sequential block of three-address code statements. Some embodiments generate this pipeline of codelets by exploiting parallelism within and across pipeline stages. Each of these codelets will be mapped one-to-one to a DSPU in the packet-processing pipeline by the DSPU configuration generation module 1560.

To partition the sequential code into codelets, some embodiments perform the following steps:

1. Create a node for each statement in the flattened, sequential, three-address code (1545).

2. Create a bidirectional edge between N1 and N2, where N1 is a read from a state scalar/state array and N2 is a write into the same state scalar/state array. This step reflects the constraint that state variables are internal to individual DSPUs. Since state variables are internal to individual DSPUs and do not occur in any instructions other than reads and writes, this step is sufficient for handling state variables for some embodiments.

3. Create an edge (N1, N2) for every pair of nodes N1, N2 where N2 reads a variable written by N1. Some embodiments only check read-after-write dependencies because the compiler has turned control dependencies into data dependencies when it generates the straight-line code (at the if-conversion module 1510). Further, the conversion to SSA (at the SSA conversion module 1530) has already removed all write-after-read and write-after-write dependencies.

Figure 18:
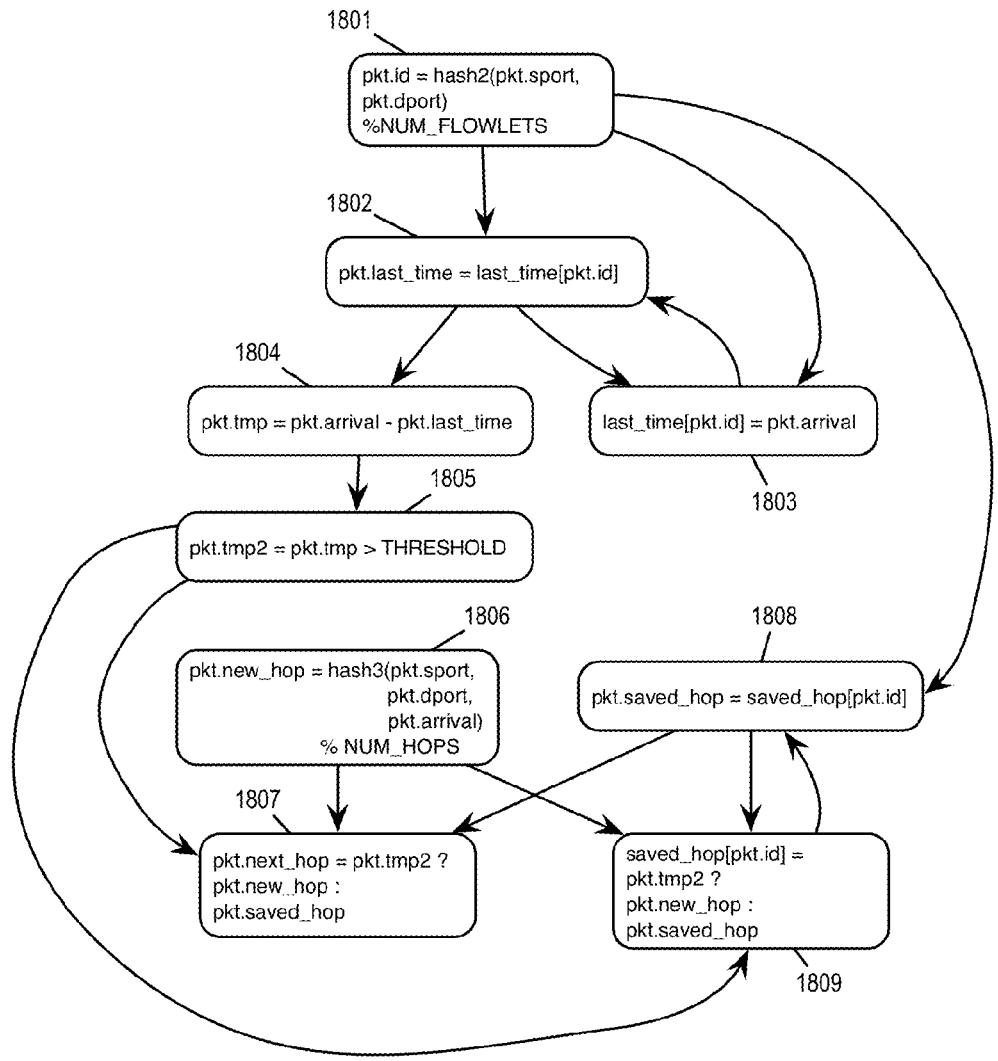
FIGS. 18-19 illustrate the identification of SCCs and the creation of DAG based on the identified SCCs.
Figure 19:
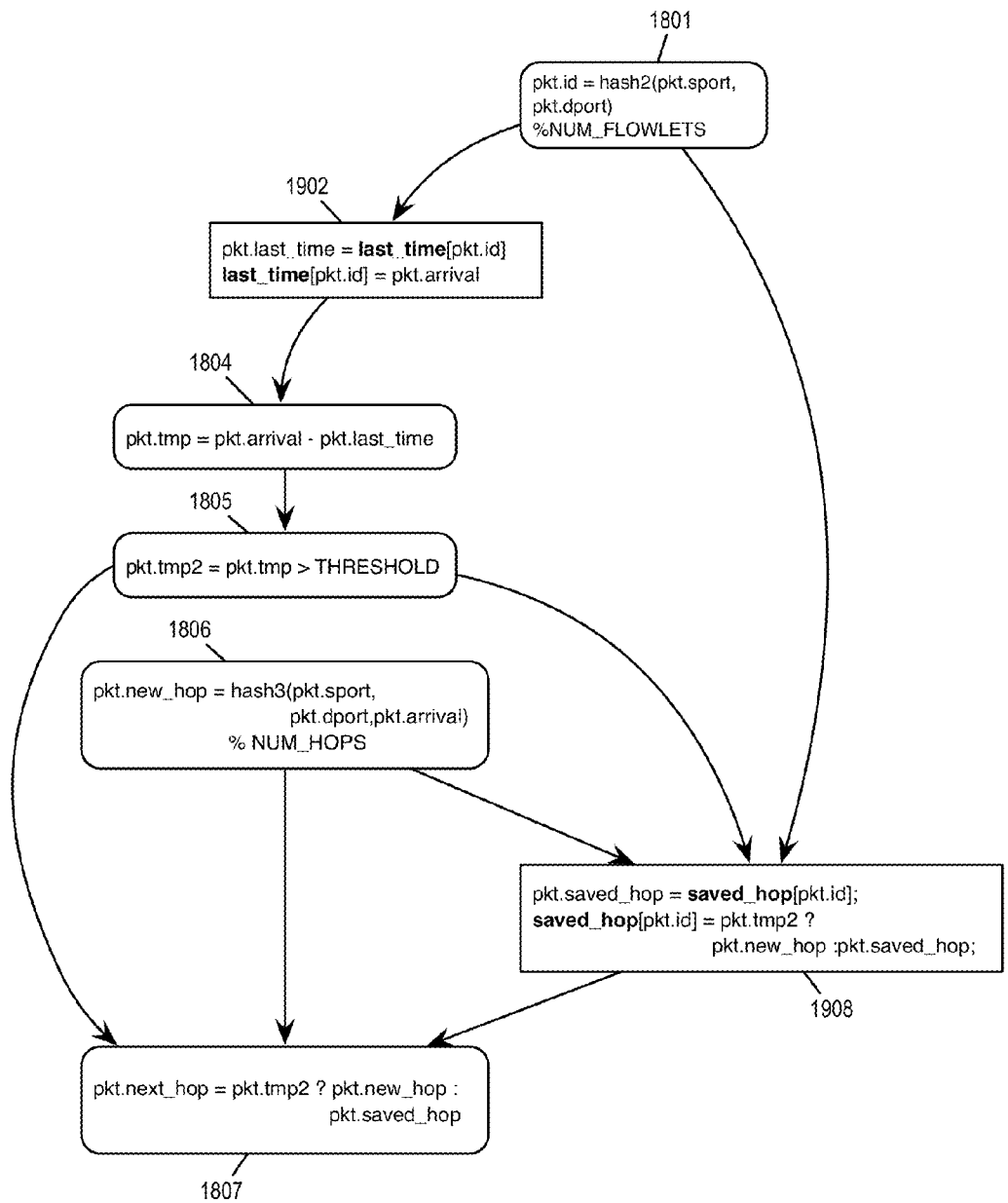

4. Identify strongly connected components (SCCs) of the resulting graph and condense the SCCs to create a directed acyclic graph (DAG). FIGS. 18-19 illustrate the identification of SCCs and the creation of DAG based on the identified SCCs. FIG. 18 illustrates the partitioned code before the condensation into DAG. As illustrated, the code is partitioned into nodes 1801-1809 that are interconnected by arrows, where each node represents an operation and each arrow represents a logical dependency between two nodes. Nodes 1802 and 1803 are identified as one SCC as they are the load and store operations of the state variable last_time[pkd.id]. Nodes 1808 and 1809 are identified as another SCC as they are the load and store operations of the state variable saved_hop[pkd.id]. These two SCCs respectively condensed into nodes 1902 and 1908 in the resulting DAG of FIG. 19. The condensation of these SCCs is to ensure all operations on a given state variable (e.g., read, write, modify) must reside within a same DSPU because each state variable is local to a DSPU.

5. Schedule the resulting DAG using critical path scheduling and creating a new pipeline stage every time one operation needs to follow another. This operation creates the pipelined codelets 1555 that together implement the packet transactions specified by the source code 1510. Codelets that do not manipulate state variables, or stateless codelets (e.g., 1801, 1804, 1805, 1806, 1807) contain exactly one three-address code instruction. Codelets that manipulate state variables, or stateful codelets (e.g., 1902, 1908) contain at least two statements, a read from a state variable and a write to a state variable and optionally includes one or more updates to the state variable through packet temporaries.

The DSPU configuration generation module 1560 takes the pipelined codelets 1555 and converts them into executable DSPU configurations (i.e., instructions to be stored in instruction memories of DSPUs). However, since DSPUs are highly constrained processing units designed for synchronous operations in the packet processing data paths/data-plane, not all pipelined codelets are executable on DSPUs. Consequently, the DSPU compiler at the configuration generation module 1560 also checks each codelet to see if it is executable on a DSPU.

In some embodiments, the compiler uses a DSPU constraint template to perform the executability check. Some embodiments returns compiler error if any of the codelets fail to comply with the requirement of the constraint template. In some embodiments, a DSPU constraint template defines a space of possible computations that are executable on the DSPU (such as different ALU operations, or different permitted sequences of length N of three-address instructions). When the compiler processes a pipelined codelet into DSPU configuration, it also selects an exact computation from the space of possible computations executable on the DSPU. In some embodiments, the DSPU constraint template is also a synthesis template or syntax guide, where the compiler synthesizes the configuration for a DSPU by fitting syntax element of a codelet (variables, operators, and constants) with the synthesis template. If the syntax of a codelet is not able to fit the constraint/synthesis template, the compiler indicates compiler error as the compiler is not able to create an executable DSPU configuration out of the codelet.

Some embodiments use a synthesis tool such as SKETCH to perform the synthesis of DSPU configuration. SKETCH allows the programmer to use natural imperative syntax to specify a synthesis template or partial program with "holes" that are then filled in by the synthesis tool to match the codelet. (In computer science, imperative programming refers to a programming paradigm that uses statements that change a program's state. An imperative program consists of commands for the computer to perform and focuses on how a program operates.) The example DSPU constraint template 1590 illustrates a synthesis template that is specified as a SKETCH shorthand, where the "??" are the holes that can be filled in.

In some embodiments, the synthesis tool is able to perform synthesis and executability check for different DSPU designs. These different DSPU designed can be specified by different synthesis/constraint templates. Table 2 below lists some example synthesis/constraint templates for different DSPU designs that are written in SKETCH.

grid of DSPUs in the data-plane pipeline stages to perform various algorithms. In some embodiments, these algorithms

TABLE 2

SKETCH codes for different DSPU designs

| DSPU Design | SKETCH code |
| --- | --- |
| Write | x = Mux2 (pkt_1 , Const ( )); |
| ReadAddWrite | x = Opt(x) + Mux2 (pkt_1 , Const ( )); |
| Predicated ReadAddWrite | if ( rel_op (Opt(x), Mux3 (pkt_1 , pkt_2 , Const ( )))) {<br>   x = Opt(x) + Mux3 (pkt_1 , pkt_2 , Const ( ));<br>} |
| If-Else ReadAddWrite | if ( rel_op (Opt(x), Mux3 (pkt_1 , pkt_2 , Const ( )))) {<br>   x = Opt(x) + Mux3 (pkt_1 , pkt_2 , Const ( ));<br>} else {<br>   x = Opt(x) + Mux3 (pkt_1 , pkt_2 , Const ( ));<br>} |
| Subtract | if ( rel_op (Opt(x), Mux3 (pkt_1 , pkt_2 , Const ( )))) {<br>   x = Opt(x) + Mux3 (pkt_1 , pkt_2 , Const ( )) − Mux3 (pkt_1 , pkt_2 , Const ( ));<br>} else {<br>   x = Opt(x) + Mux3 (pkt_1 , pkt_2 , Const ( )) − Mux3 (pkt_1 , pkt_2 , Const ( ));<br>} |
| Nested IFs | if ( rel_op (Opt(x) + Mux2 (pkt_1 , pkt_2 ) − Mux2 (pkt_1 , pkt_2 ), Const ( ))) {<br>  if ( rel_op (Opt(x) + Mux2 (pkt_1 , pkt_2 ) − Mux2 (pkt_1 , pkt_2 ), Const ( ))) {<br>    x = Opt(x) + Mux3 (pkt_1 , pkt_2 , Const ( )) − Mux3 (pkt_1 , pkt_2 , Const ( ));<br>  } else {<br>    x = Opt(x) + Mux3 (pkt_1 , pkt_2 , Const ( )) − Mux3 (pkt_1 , pkt_2 , Const ( ));<br>  }<br>} else {<br>  if ( rel_op (Opt(x) + Mux2 (pkt_1 , pkt_2 ) − Mux2 (pkt_1 , pkt_2 ), Const ( ))) {<br>    x = Opt(x) + Mux3 (pkt_1 , pkt_2 , Const ( )) − Mux3 (pkt_1 , pkt_2 , Const ( ));<br>  } else {<br>    x = Opt(x) + Mux3 (pkt_1 , pkt_2 , Const ( )) − Mux3 (pkt_1 , pkt_2 , Const ( ));<br>  }<br>} |
| Paired Updates | if ( rel_op ( Mux2 (x, y) + Mux2 (pkt_1 , pkt_2 ) − Mux2 (pkt_1 , pkt_2 ), Const ( ))) {<br>  if ( rel_op ( Mux2 (x, y) + Mux2 (pkt_1 , pkt_2 ) − Mux2 (pkt_1 , pkt_2 ), Const ( ))) {<br>    x = Opt(x) + Mux3 (pkt_1 , pkt_2 , Const ( )) − Mux3 (pkt_1 , pkt_2 , Const ( ));<br>    y = Opt(y) + Mux3 (pkt_1 , pkt_2 , Const ( )) − Mux3 (pkt_1 , pkt_2 , Const ( ));<br>  } else {<br>    x = Opt(x) + Mux3 (pkt_1 , pkt_2 , Const ( )) − Mux3 (pkt_1 , pkt_2 , Const ( ));<br>    y = Opt(y) + Mux3 (pkt_1 , pkt_2 , Const ( )) − Mux3 (pkt_1 , pkt_2 , Const ( ));<br>  }<br>} else if ( rel_op ( Mux2 (x, y) + Mux2 (pkt_1 , pkt_2 ) − Mux2 (pkt_1 , pkt_2 ), Const ( ))) {<br>  if ( rel_op ( Mux2 (x, y) + Mux2 (pkt_1 , pkt_2 ) − Mux2 (pkt_1 , pkt_2 ), Const ( ))) {<br>    x = Opt(x) + Mux3 (pkt_1 , pkt_2 , Const ( )) − Mux3 (pkt_1 , pkt_2 , Const ( ));<br>    y = Opt(y) + Mux3 (pkt_1 , pkt_2 , Const ( )) − Mux3 (pkt_1 , pkt_2 , Const ( ));<br>  } else {<br>    x = Opt(x) + Mux3 (pkt_1 , pkt_2 , Const ( )) − Mux3 (pkt_1 , pkt_2 , Const ( ));<br>    y = Opt(y) + Mux3 (pkt_1 , pkt_2 , Const ( )) − Mux3 (pkt_1 , pkt_2 , Const ( ));<br>  }<br>} |

The SKETCH notations used in Table 2 are explained in Table 3:

TABLE 3

SKETCH notations used in DSPU constraint/synthesis templates

| SKETCH construct | Description |
| --- | --- |
| MuxN(a1, a2, . . . , aN) | N-to-1 multiplexer with enable bit. If enabled, return one of a1, a2, . . . aN. If disabled, return 0. |
| Opt(a) | Return a or 0. |
| rel_op(x, y) | rel_op(x, y) Return one of x < y, x > y, x! = y, x == y. |
| Const( ) | Return an integer constant in the range [0, 31]. |
| x, y | State variables |
| pkt_1, pkt_2 | Packet fields |

IV. Applications Using DSPU

DSPUs (programmable stateful processing units) as described above provide a powerful mechanism for performing a variety of applications. These applications utilize the are implemented as operations based on stateful variables and packet variables associated with data packets. In some embodiments, a DSPU-implemented application uses stateful variables to maintain stateful information across different packets (of a particular class of packets), while packet variables are used to perform computations that are specific to one packet.

Some embodiments implement these algorithms in P4 programming language, which is a programming language designed to allow programming of packet forwarding in data-planes. In contrast to general purpose language such as C or python, P4 is domain-specific language with a number of constructs optimized around network data forwarding.

FIG. 20 illustrates a P4 object for specifying the behavior of DSPU. In some embodiments, a DSPU is also referred to as a Stateful ALU ("stateful_alu"). As illustrated, the stateful ALU object has several parameters. The parameter "register" is for representing stateful variables. The parameters "condition_a" and "condition_b" are for conditional statements that can be implements to the comparators of the DSPU (i.e., CMP-Hi 941 and CMP-Lo 942). The parameters "update_hi_1_value", "update_lo_1_value", "update_hi_2_value", "update_lo_2_value" specifies the computation that is to be performed at the ALUs of the DSPU (i.e., ALU-1-Hi 951, ALU-1-Lo 952, ALU-2-Hi 953, and ALU-2-Lo 954). The parameters "update_hi_1_predicate", "update_lo_1_predicate", "update_hi_2_predicate", "update_lo_2_predicate" specify the Boolean conditions under which each of the ALUs is predicated on (i.e., the predicate fields for the 4 ALUs 951-954). (These ALUs provide the updated value of state variables or packet variables, so they are also referred to as update ALUs.)

The parameter "output_predicate" is for specifying a Boolean expression for determining whether the output of the DSPU should be predicated on or off. The parameter "output_expr" is for selecting a source to output from either the update ALUs ("new_hi" or "new_lo" or the previous state memory values ("old_hi" and "old_lo").

The parameter "output_dst" is for specifying a destination for the output of the DSPU, which can be a field in the output derivative PHV, or a OR that combines the output of several DSPUs.

The following are descriptions of some of these application/algorithms. Each of these applications uses DSPUs to perform stateful computations (i.e., use and update state variables).

A. Flowlet Switching

A flowlet is a burst of packets of a same flow that are separated by certain amount of time from other bursts of packets of the same flow. Flowlet switching is an algorithm that chooses between a new next hop and a flowlet's saved next hop based on an elapsing of time or time delta. FIG. 21 illustrates a code fragment 2100 for execution on DSPUs for flowlet switching. The expression 2110 performs a three-operand comparison to compute a time delta and to determine if the time delta has exceeded a flowlet threshold. If the flowlet threshold is exceeded, the DSPU update the flowlet's saved next hop, which is a state variable maintained by the DSPU.

B. Learning Bloom Filter

A Bloom filter is a bit array of m bits that are written into by k different hash functions. FIG. 22 illustrates a code fragment 2200 for using DSPUs to check for membership and add to the Bloom filter. The code employs three DSPUs to implement the three different hash functions (2211, 2212, 2213), each DSPU maintains and updates a Bloom filter bit array as its state variable. Each DSPU output its state variable (i.e., its Bloom filter bit array), and the outputs of the three DSPUs are ORed together (2230) as the output of the filter.

C. Heavy Hitter

Heavy hitter is an algorithm that identifies traffic sources (or flows) generating traffic rates over a certain threshold. It uses multiple hashes to identify the flow and increment a counter per hash. FIG. 23 illustrates a code fragment 2300 for using DSPUs to perform heavy hitter algorithm. The code uses three DSPUs (2311, 2312, 2313) each compute a hash and maintains a state variable (register) as counter. Each also and checks the counter value against a high threshold and a low threshold. The state variable/counter is incremented on every packet.

D. Conga

Conga is an intelligent routing algorithm where receivers push information back to the transmitters about path utilization. On the transmit side, the algorithm selects next hops for flowlets and processes utilization message from receivers. On the receive side, the algorithm tracks utilization and generate messages to receivers. FIG. 24 illustrates a code segment 2400 for using DSPUs to perform Conga algorithm. A DSPU stores the identity of a preferred next hop (or best path) and the utilization of the preferred next hop as two state variables. These two state variables are simultaneously and conditionally updated (2421 and 2422) by Hi and Lo update ALUs. The DSPU updates both the utilization and identity state variables when there is a better path. The DSPU update only the utilization state variable when there is no better path.

E. Rate Control Protocol (RCP)

Rate Control Protocol (RCP) is a congestion control algorithm designed for fast download times (i.e., aka user response times, or flow completion times) for the typical flows of typical users. RCP requires only a small amount of per-packet processing—in the worst case 3 integer additions, 2 comparisons, and 1 write operation. Upon packet arrival the router update counts for the corresponding output port of the running RTT sum, the number of arriving bytes, and the number of packets carrying a valid RTT. On packet departure the router overwrites the bottleneck rate carried in the packet if need be. A description of RCP can be found in http://yuba.stanford.edu/~nanditad/thesis-NanditaD.pdf. Some embodiments implements RCP algorithm on DSPUs, where a DSPU maintains RTT sum as a state variable. Specifically, the DSPU accumulate RTT sum if RTT is under maximum allowable RTT.

F. Periodic Sampling

Some embodiments use DSPUs to perform periodic sampling of packets. In some embodiments, a DSPU maintains a packet count as state variable and update the packet count for every packet. When the packet count reaches N, the DSPU marks and sample a packet reset the packet count.

G. CoDel

Some embodiments use DSPUs to perform CoDel algorithm. CoDel is a scheduling algorithm for controlled delay in network routing. If all packets in the last interval (starts at 100 ms) have a queuing delay of >5 ms, the algorithm drops the packet, and increments a num_dropped counter to record how many packets have been dropped. The algorithm sets the interval to 100 ms*1/sqrt(numdropped). If a packet with queuing delay of <5 ms is seen, the algorithm resets the interval to 100 ms and resets numdropped to 0. One state variable records end_of_interval time, while another state variable records numdropped. In some embodiments the two state variable are updated by Hi and Lo ALUs of a same DSPU. In some embodiments, the two state variables are maintained and updated by two different DSPUs at different pipeline stages.

H. Other Applications

Some embodiments use DSPUs to perform other Algorithms such as HULL, AVQ, or trTCM.

Description of HULL algorithm can be found in "Less is more Trading a little bandwidth for ultra-low latency in the data center" Presented as part of the 9th USENIX Symposium on Networked Systems Design and Implementation (NSDI 12) (San Jose, Calif., 2012), USENIX, pp. 253-266 by ALIZADEH, M., ABBANI, A., EDSALL, T., PRABHAKAR, B., VAHDAT, A., AND YASUDA, M. When executing HULL algorithm, DSPUs in some embodiments statefully update counter for virtual queue.

Description of AVQ algorithm can be found in "An adaptive virtual queue (AVQ) algorithm for active queue management" in IEEE/ACM Trans. Netw. 12, 2 (April 2004), 286-299 by KUNNIYUR, S. S., AND SRIKANT, R.

When executing AVQ algorithm, DSPUs in some embodiments statefully update virtual queue size and virtual capacity.

Description of trTCM algorithm can be found in "RFC 2698—a two rate three color meter" at https://tools:ietf:org/html/rfc2698. When executing trTCM algorithm, DSPUs in some embodiments statefully update token counts for each token bucket.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 25:
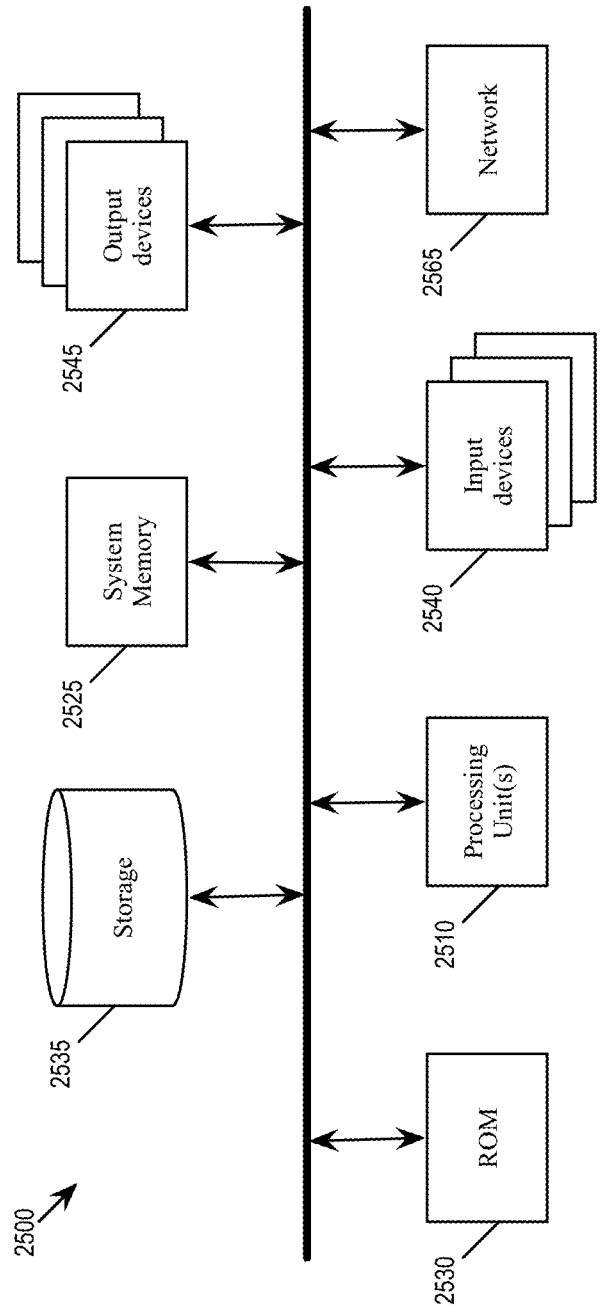
FIG. 25 conceptually illustrates an electronic system with which some embodiments of the invention are implemented.

FIG. 25 conceptually illustrates an electronic system 2500 with which some embodiments of the invention are implemented. The electronic system 2500 can be used to execute any of the control, virtualization, or operating system applications described above. The electronic system 2500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2500 includes a bus 2505, processing unit(s) 2510, a system memory 2525, a read-only memory 2530, a permanent storage device 2535, input devices 2540, and output devices 2545.

The bus 2505 collectively represents all system, peripheral, and chipset buses that communicatively connect the numerous internal devices of the electronic system 2500. For instance, the bus 2505 communicatively connects the processing unit(s) 2510 with the read-only memory 2530, the system memory 2525, and the permanent storage device 2535.

From these various memory units, the processing unit(s) 2510 retrieves instructions to execute and data to process in order to execute the processes of the invention. The processing unit(s) may be a single processor or a multi-core processor in different embodiments.

The read-only-memory (ROM) 2530 stores static data and instructions that are needed by the processing unit(s) 2510 and other modules of the electronic system. The permanent storage device 2535, on the other hand, is a read-and-write memory device. This device is a non-volatile memory unit that stores instructions and data even when the electronic system 2500 is off. Some embodiments of the invention use a mass-storage device (such as a magnetic or optical disk and its corresponding disk drive) as the permanent storage device 2535.

Other embodiments use a removable storage device (such as a floppy disk, flash drive, etc.) as the permanent storage device. Like the permanent storage device 2535, the system memory 2525 is a read-and-write memory device. However, unlike storage device 2535, the system memory is a volatile read-and-write memory, such a random access memory. The system memory stores some of the instructions and data that the processor needs at runtime. In some embodiments, the invention's processes are stored in the system memory 2525, the permanent storage device 2535, and/or the read-only memory 2530. From these various memory units, the processing unit(s) 2510 retrieves instructions to execute and data to process in order to execute the processes of some embodiments.

The bus 2505 also connects to the input and output devices 2540 and 2545. The input devices enable the user to communicate information and select commands to the electronic system. The input devices 2540 include alphanumeric keyboards and pointing devices (also called "cursor control devices"). The output devices 2545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 25, bus 2505 also couples electronic system 2500 to a network 2565 through a network adapter (not shown). In this manner, the computer can be a part of a network of computers (such as a local area network ("LAN"), a wide area network ("WAN"), or an Intranet, or a network of networks, such as the Internet. Any or all components of electronic system 2500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIG. 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
performing first and second computations at first and second arithmetic logic units (ALUs) of the DSPU to produce first and second ALU outputs, respectively;
performing a third computation at a comparator of the DSPU that is used by the DSPU to produce first and second enabling signals, wherein the first enabling signal is for predicating the first ALU output and the second enabling signal is for predicating the second ALU output; and
based on the enabling signals, using a set of the first and second outputs to generate an output of the DSPU,
wherein each of the first, second, and third computations is based on a plurality of operands that are selected from (i) a packet header vector (PHV) received by the DSPU that comprises a plurality of values relating to a packet and (ii) a stateful variable maintained by the DSPU that is identified for the computations based on the PHV values.

2. The method of claim 1, wherein different stateful variables maintained by the DSPU are identified based on different PHV values.

3. The method of claim 1, wherein the stateful variable is retrieved from a memory location having an address that is derived from the PHV values.

4. The method of claim 1, wherein the PHV is derived at least in part from a set of packet header values.

5. The method of claim 4, wherein the set of packet header values comprises identifiers of a L4 connection.

6. A programmable stateful processing unit (SPU) comprising:
first and second arithmetic logic units (ALUs) for performing first and second computations to produce first and second ALU outputs, respectively;
a comparator for performing a third computation to produce a comparator output; and
a predicator for producing first and second enabling signals based on the comparator output, the first enabling signal for predicating the first ALU output and the second enabling signal for predicating the second ALU output, wherein the first and second ALU outputs are used to generate an output of the programmable SPU based on the enabling signals,
wherein each of the first, second, and third computations is based on a plurality of operands that are selected from (i) a packet header vector received by the programmable SPU that comprises a plurality of values relating to a packet and (ii) a stateful variable maintained by the programmable SPU that is identified for the computations based on the PHV values.

7. The programmable stateful processing unit of claim 6, wherein the comparator is for determining a first true/false condition used by the predicator to produce the first enabling signal and a second true/false condition used by the predicator to produce the second enabling signal.

8. The programmable stateful processing unit of claim 6, wherein the comparator is a first comparator, wherein the programmable SPU further comprises a second comparator and third and fourth ALUs, wherein the third ALU is for extending a width of first computation performed by the first ALU, the fourth ALU is for extending a width of second computation performed by the second ALU, and the second comparator is for extending a width of the third computation performed by the first comparator.

9. The programmable stateful processing unit of claim 8, wherein the predicator is further for producing third and fourth enabling signals based on the output of the extended third computation, the third enabling signal for predicating the output of the third ALU that extends the first computation and the fourth enabling signal for predicating the output of the fourth ALU that extends the second computation.

10. The programmable stateful processing unit of claim 6, wherein the first and second ALU outputs are merged to produced a merged ALU output based on the first and second enabling signals.

11. The programmable stateful processing unit of claim 10, wherein the programmable SPU further comprises an output multiplexer for producing the output of the programmable SPU by selecting among (i) the merged ALU output, (ii) the received PHV, (iii) the stateful variable that is identified based on the PHV, and (iv) the result of the first computation.

12. The programmable stateful processing unit of claim 6, wherein the programmable SPU further comprises a stateful variable update multiplexer for producing an update to the identified stateful variable by selecting among (i) the stateful variable that is identified based on the PHV and (ii) the merged ALU output.

13. The programmable stateful processing unit of claim 11, wherein the first and second ALUs and the comparator perform the first, second, and third computations during a first clock cycle and the output multiplexer performs the selection during a second clock cycle subsequent to the first clock cycle.

14. A system for performing packet forwarding operations, the system comprising:
a plurality of pipeline stages, wherein a first pipeline stage receives incoming packets that are to be processed by each of the pipeline stages, wherein each pipeline stage comprises a set of programmable data plane stateful processing units (DSPUs), each DSPU comprising:

first and second arithmetic logic units (ALUs) for performing first and second computations to produce first and second ALU outputs, respectively;
a comparator for performing a third computation to produce a comparator output; and
a predicator for producing first and second enabling signals based on the comparator output, the first enabling signal for predicating the first ALU output and the second enabling signal for predicating the second ALU output, wherein the first and second ALU outputs are used to generate an output of the programmable DSPU based on the enabling signals
wherein each of the first, second, and third computations is based on a plurality of operands that are selected from (i) a packet header vector (PHV) received by the programmable DSPU that comprises a plurality of values relating to one of the incoming packets and (ii) a stateful variable maintained by the programmable DSPU that is identified for the computations based on the PHV values.

15. The system of claim 14, wherein each pipeline stage is a match-action stage further comprising a match table and an action engine, wherein the match table is for matching an incoming PHV against a set of rules and for indicating a result of the matching, wherein the action engine performs an action based on said result of the matching and the output of the DSPU in the pipeline stage.

16. The system of claim 14, wherein each DSPU retrieves its state variable from a memory location having an address that is derived from the values of its received PHV.

17. The system of claim 14, wherein the PHV is derived at least in part from a set of packet header values of the incoming packet.

18. The system of claim 17, wherein the set of packet header values comprises identifiers of a L4 connection.

19. The system of claim 14, wherein the comparator is for determining a first true/false condition used by the predicator to produce the first enabling signal and a second true/false condition used by the predicator to produce the second enabling signal.

20. The programmable stateful processing unit of claim 6, wherein the output of the programmable SPU is used to modify the PHV.

* * * * *